US007916937B2

(12) United States Patent
Utsugi et al.

(10) Patent No.: US 7,916,937 B2
(45) Date of Patent: Mar. 29, 2011

(54) IMAGE PROCESSING DEVICE HAVING COLOR SHIFT CORRECTING FUNCTION, IMAGE PROCESSING PROGRAM AND ELECTRONIC CAMERA

(75) Inventors: Akihiko Utsugi, Tokyo (JP); Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 434 days.

(21) Appl. No.: 11/545,559

(22) Filed: Oct. 11, 2006

(65) Prior Publication Data

US 2007/0116375 A1    May 24, 2007

Related U.S. Application Data

(63) Continuation of application No. PCT/JP2005/006951, filed on Apr. 8, 2005.

(30) Foreign Application Priority Data

Apr. 12, 2004    (JP) ................................. 2004-116584
May 31, 2004    (JP) ................................. 2004-161474

(51) Int. Cl.
G06K 9/00    (2006.01)

(52) U.S. Cl. ........................................ 382/162; 382/167

(58) Field of Classification Search ........... 382/162–167
See application file for complete search history.

(56) References Cited

U.S. PATENT DOCUMENTS

| 6,483,941 | B1 * | 11/2002 | Li .................................. 382/167 |
| 6,587,224 | B1 | 7/2003 | Nabeshima et al. |
| 6,853,400 | B1 * | 2/2005 | Matama .......................... 348/96 |
| 2005/0168644 | A1 * | 8/2005 | Demas et al. ................. 348/630 |

FOREIGN PATENT DOCUMENTS

| EP | 0 878 970 A | 11/1998 |
| EP | 1 251 687 A | 10/2002 |
| JP | A 03-263993 | 11/1991 |
| JP | B2 2528826 | 6/1996 |
| JP | A 2000-299874 | 10/2000 |
| JP | A 2002-344978 | 11/2002 |
| JP | A 2003-255424 | 10/2003 |
| JP | A 2004-064710 | 2/2004 |
| JP | A 2004-153323 | 5/2004 |
| JP | A 2004-248077 | 9/2004 |
| JP | A 2005-167485 | 6/2005 |

* cited by examiner

*Primary Examiner* — Bhavesh M Mehta
*Assistant Examiner* — Sean Motsinger
(74) *Attorney, Agent, or Firm* — Oliff & Berridge, PLC

(57) ABSTRACT

An image processing device performs image processing to an image represented by a plurality of color component planes and includes a correction unit and an erroneous correction detection unit. The correction unit corrects a color shift in the image. The erroneous correction detection unit judges that the correction unit has made an erroneous correction by comparing the images before and after the correction. More preferably, the erroneous correction detection unit judges the erroneous correction when a chrominance of a portion to be processed of the image after the correction is not within an allowable range which is set using the image before the correction as a reference.

6 Claims, 14 Drawing Sheets

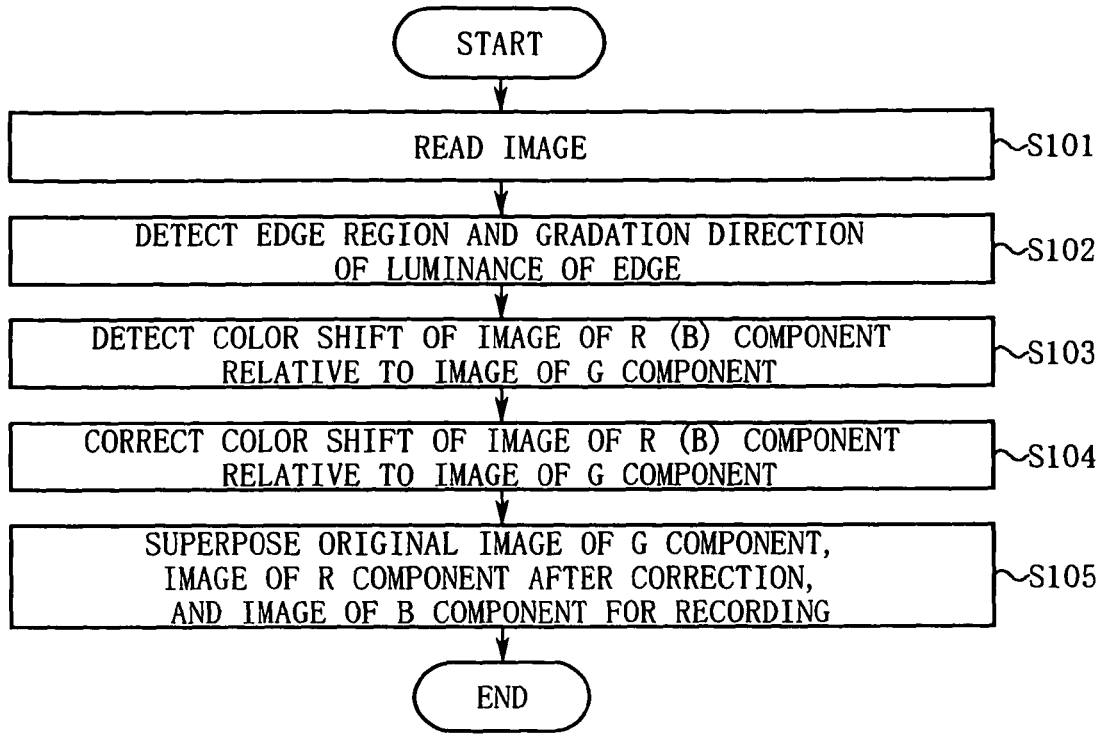
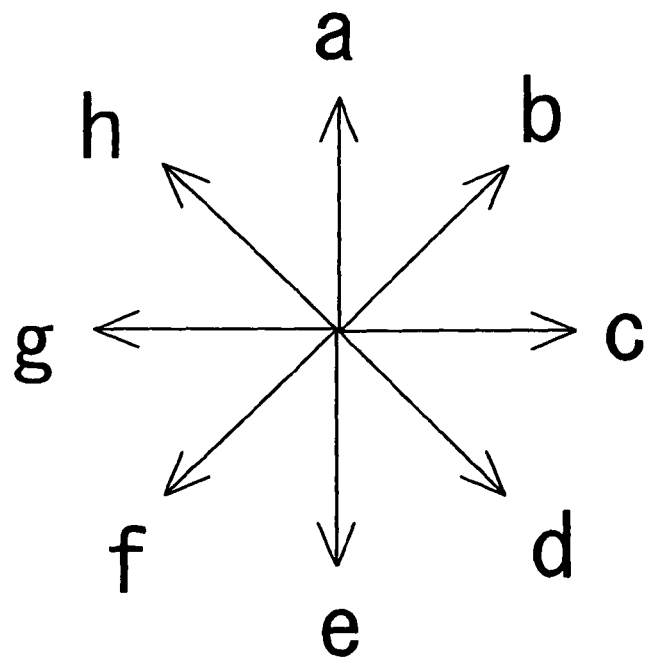

| 0 | 1 | 0 |
|---|---|---|
| 0 | 0 | 0 |
| 0 | −1 | 0 |

(b)

| 0 | 0 | 1 |
|---|---|---|
| 0 | 0 | 0 |
| −1 | 0 | 0 |

(c)

| 0 | 0 | 0 |
|---|---|---|
| −1 | 0 | 1 |
| 0 | 0 | 0 |

(d)

| −1 | 0 | 0 |
|---|---|---|
| 0 | 0 | 0 |
| 0 | 0 | 1 |

(e)

| 0 | −1 | 0 |
|---|---|---|
| 0 | 0 | 0 |
| 0 | 1 | 0 |

(f)

| 0 | 0 | −1 |
|---|---|---|
| 0 | 0 | 0 |
| 1 | 0 | 0 |

(g)

| 0 | 0 | 0 |
|---|---|---|
| 1 | 0 | −1 |
| 0 | 0 | 0 |

(h)

| 1 | 0 | 0 |
|---|---|---|
| 0 | 0 | 0 |
| 0 | 0 | −1 |

IMAGE PROCESSING DEVICE HAVING COLOR SHIFT CORRECTING FUNCTION, IMAGE PROCESSING PROGRAM AND ELECTRONIC CAMERA

CROSS REFERENCE TO RELATED APPLICATION

This application is a continuation application of International Application PCT/JP 2005/006951, filed Apr. 8, 2005 designating the U.S., and claims the benefit of priority from Japanese Patent Application No. 2004-116584, filed on Apr. 12, 2004 and No. 2004-161474, filed on May 31, 2004, the entire contents of which are incorporated herein by reference.

BACKGROUND OF THE INVENTION

1. Field of the Invention

The present invention relates to an image processing device, an image processing program, and an electronic camera.

2. Description of the Related Art

In general, in an electronic camera, it is known that a color shift occurs in captured image data due to the chromatic aberration of magnification of an optical imaging system. There has been proposed of a conventional technique to correct such a color shift by image processing.

For example, a conventional device disclosed in Japanese Unexamined Patent Application Publication No. 2000-299874 (hereinafter, Document 1) detects a color shift in an edge part of an image first and corrects chromatic aberration of magnification by performing image processing based on the color shift.

Further, a conventional device disclosed in Japanese Unexamined Patent Application Publication No. 2002-344978 (FIG. 1, FIG. 3) (hereinafter, Document 2) performs magnification adjustment for each color component of an image and corrects chromatic aberration of magnification by finding a point at which a difference between color components is minimum.

Furthermore, Japanese Patent No. 2528826 (hereinafter, Document 3) describes a technique for correcting a color shift that occurs at the time of motion image shooting etc, by locally detecting a color shift.

An electronic camera incorporating an image pickup device of single-plate type has color filters of RGB etc. arranged on an image pickup plane and generates RAW data in one kind of color component is arranged on each pixel.

The electronic camera generates image data having all colors on each pixel by generating missing color components of the RAW data through color interpolation processing. Along with the color interpolation processing, false color noises occur in image data. In order to reduce the false color noises, the electronic camera performs spatial frequency low-pass filtering to the chrominance component of the image data (hereinafter, this processing is referred to as "chrominance LPF").

The inventors of the present application have found that the chrominance LPF and false color causes problems in the detection and correction of the amount of aberration disclosed in the Documents 1 and 2. The problems are as follows.

[Problems Due to Chrominance LPF]

In an image region with a high spatial frequency (that is, an edge part or a fine picture), a slight chrominance change occurs due to a color shift caused by chromatic aberration of magnification. The slight chrominance change will be a chrominance component of a high frequency area and removed by the above-described chrominance LPF. As a result, in the image region with a high spatial frequency, the color shift due to chromatic aberration of magnification is reduced by the chrominance LPF processing.

On the other hand, in an image region with a low spatial frequency (a gradation part with a gradual change), a gradual chrominance change in the low frequency region occurs due to a color shift caused by the chromatic aberration of magnification. The chrominance change in the low frequency region is not removed by the above-described chrominance LPF and allowed to pass. In other words, in the image region with a low spatial frequency, the color shift due to chromatic aberration of magnification remains even after the chrominance LPF processing.

Through such chrominance LPF, in the screen there appear both of a region with the chromatic aberration of magnification reduced and a region with the chromatic aberration of magnification not reduced (an uneven state).

The above-described Documents 1 and 2 premise that the color shift due to chromatic aberration of magnification occurs in point symmetry with respect to the screen center (optical axis center). However, chrominance LPF causes unevenness in the chromatic aberration of magnification and the point symmetry is readily lost. Detection of the amount of aberration in such a state will cause errors in the detection result.

[Problems Due to False Color]

If the chrominance LPF is removed or weakened in order to avoid the problems in the detection and correction of the above-mentioned chromatic aberration of magnification, there arises a problem in turn that the false color noises at the time of color interpolation remains as they are. In this case, the screen is brought into a state in which both of the color shifts due to chromatic aberration of magnification and the false color noises occur in a complex manner. In such a state, errors are likely to occur in the detection result of the amount of aberration.

According to the Documents 1 and 2, in particular, the color shift due to chromatic aberration of magnification is corrected uniformly in the screen, therefore, it is not possible to avoid the errors. Because of this, in a region in which the color shift due to chromatic aberration of magnification has been reduced in advance, it is likely that the correction of color shift acts excessively and a color shift in the opposite direction is generated sometimes. As a result, more complex false color noises occur.

[Problems when Color Shift does not Occur Symmetrically Around a Center Point]

Further, the Documents 1 and 2 are on the premise that the center of the screen of an image is the optical axis of the lens used at shooting, and the chromatic aberration of magnification occurs regularly around the optical axis. Therefore, when a lens used at the shooting is a shift lens or a lens with a hand movement correction function, the chromatic aberration of magnification cannot be corrected since the center thereof shifts from the screen center. Also, in a case where the image to be processed is an image after trimming, it cannot be corrected since the position of the image corresponding to the optical axis is uncertain.

Note that, the above-described Document 3 describes a local detection of a color shift. However, color shift detection is performed on a portion that needs no correction, therefore, the processing takes a lot of time. Further, the color shift detection is made similarly on all of the portions irrespective of the position and structure of a portion to be corrected, requiring extraneous processing time. Furthermore, the correction may not be performed properly.

SUMMARY OF THE INVENTION

In view of solving the above problems, an object of the present invention is to provide a technique to optimally perform color shift correction to an image having a plurality of color component planes.

Further, another object of the present invention is to provide a novel idea of monitoring erroneous correction of a color shift at the time of correcting the color shift of an image.

Furthermore, still another object of the present invention is to provide a technique to correctly detect a color shift due to chromatic aberration of magnification, taking the influence of false colors etc. into account.

[1] An image processing device of the present invention performs image processing to an image represented by a plurality of color component planes and includes a correction unit and an erroneous correction detection unit.

The correction unit corrects a color shift in the image. The erroneous correction detection unit judges that the correction unit has made an erroneous correction by comparing the images before and after the correction by the correction unit.

[2] It is preferable that the erroneous correction detection unit judge an erroneous correction when a chrominance of a portion to be processed of the image after the correction is not within an allowable range which is set using the image before the correction as a reference.

[3] It is preferable that the erroneous correction detection unit suppress the erroneous correction by limiting the chrominance of the image after the correction within the allowable range.

[4] It is preferable that the erroneous correction detection unit calculate minimum and maximum values of a group of chrominances including chrominances of the image before the correction within a local region and predetermined chrominances representing low chroma, to determine a range of the minimum and maximum values to be said allowable range. The local region includes the portion to be processed.

[5] It is preferable that the correction unit suppress the error correction by reducing a shift amount of the color shift correction when the erroneous correction detection unit judges the erroneous correction.

[6] It is preferable that the above-mentioned color shift be a color shift occurring in the image due to the chromatic aberration of magnification of an optical system, and that the correction unit adjust (resize) magnification of the color component planes in such a direction as to negate the chromatic aberration of magnification.

[7] Further, another image processing device of the present invention estimates a chromatic aberration of magnification of an optical imaging system from an input image and includes a color shift detection part and an estimation part.

The color shift detection part detects an amount of the color shift in a radius direction at a plurality of portions of the image. The estimation part calculates a statistical distribution of the chromatic aberration of magnification based on the color shift amount of the plurality of portions, and calculates a value which is greater than an average value of the statistical distribution and falls within a range of the statistical distribution, to set the calculated value as an estimation value of the chromatic aberration of magnification.

[8] It is preferable that the estimation part include a normalization part and a coefficient processing part.

The normalization part divides the color shift amount by an image height (radius) of the portions and calculates a magnification difference in the color components indicated by the color shift. The coefficient processing part calculates a histogram distribution of magnification differences calculated at each of the portions, selects, from the histogram distribution which is an asymmetric curve, such a value that it is on a biased side of the curve and that it falls within a range of the distribution of the biased side, and determines the value as an estimation value of the chromatic aberration of magnification.

[9] It is preferable that the estimation part calculate an estimation value of the chromatic aberration of magnification for each divided region of the image.

[10] It is preferable that the estimation part detect the color shift in the radius direction for each divided region of the image and vector-synthesize the color shifts between neighboring divided regions, to thereby detect even an asymmetric chromatic aberration of magnification relative to a center of the screen.

[11] Further, another image processing device of the present invention performs image processing to an image represented by a plurality of color component planes and includes an edge region detection unit, a direction detection unit, and a color shift detection unit.

The edge region detecting unit detects edge regions of the image. The direction detection unit detects a gradient direction of luminance of an edge of each of the edge regions. The color shift detection unit detects, in the gradient direction of the luminance, the color shift in an image of each of the edge regions between an image signal of an arbitrary color component plane and an image signal of another color component plane different from the arbitrary color component plane.

[12] Further, another image processing device of the present invention performs image processing to the image represented by a plurality of color component planes and includes an edge region detection unit and a color shift detection unit.

The edge region detecting unit detects edge regions of an image. The color shift detection unit detects the color shift in an image of each of the edge regions between an image signal of an arbitrary color component plane and an image signal of another color component plane different from the arbitrary color component plane in a radius direction around a part corresponding to an optical axis of an optical system used for generation of the image.

[13] It is preferable for the image processing device to further include a correction unit which corrects the color shift in each of the edge regions detected by the color shift detection unit.

[14] It is preferable for the image processing device to further include a chroma judgment unit which detects a chroma of the image in each of the edge regions and judges whether or not the chroma is higher than a predetermined value. In this case, when the chroma judgment unit judges that the chroma is higher than the predetermined value, the color shift detection unit detects the color shift.

[15] It is preferable that the color shift detection unit include, for each edge region, a window with a size which is determined according to a width of the edge of each of the edge regions, and detect the color shift in an image in the window.

[16] It is preferable that the color shift detection unit detect the color shift in the image in the window by finding a correlation between an image signal of an arbitrary color component plane and an image signal of another color component plane different from the arbitrary color component plane.

[17] It is preferable for the image processing device to further include an evaluation unit which reviews the color shift detected by the color shift detection unit based on a result of the color shift at the plurality of portions. In this case, the correction unit corrects the color shift based on a result of the review by the evaluation unit.

[18] It is preferable that the correction unit correct the color shift after performing smoothing processing to the color shift detected by the color shift detection unit.

[19] It is preferable that the above-described correction unit smooth the chrominance in each of the edge regions after correcting the color shift.

[20] An image processing program of the present invention causes a computer to function as the image processing device according to any one of the above-mentioned items [1] to [19].

[21] An electronic camera of the present invention includes the image processing device according to any one of the above-mentioned items [1] to [19] and an image pickup part that shoots an object image to generate an image. In the electronic camera, the image generated by the image pickup part is processed by the image processing device.

The image processing device in the above-mentioned item [1] not only detects and corrects a color shift but also makes a comparison between the images before and after the correction in accordance with the correction of the color shift. It judges the erroneous correction of the color shift from the comparison result.

In this way, monitoring the occurrence of the erroneous correction of the color shift makes it possible to issue a warning of and ex post facto deal with the problem, which is otherwise impossible by only performing the color shift correction.

For example, it is possible to deal with the erroneous correction by restoring the color shift correction only at an erroneously corrected portion. Further, for example, when the number of erroneously corrected portions exceeds a predetermined number (a predetermined size), it is possible to deal with the erroneous correction by performing a modified color shift correction again using the result as a reference.

In particular, the image processing device in the above-mentioned item [2] detects the erroneous correction in accordance with a change of the chrominance before and after the color shift correction. Generally, when a color shift is corrected correctly, anomalous chrominance at the portion including the color shift varies toward normal chrominance. On the other hand, when the color shift is corrected excessively or a color shift in the opposite direction occurs, the chrominance at the portion including the color shift changes in a reverse manner in many cases. Accordingly, monitoring the chrominance change before and after the color shift correction makes it possible to judge the erroneous correction more correctly.

The image processing device in the above-mentioned item [7] precisely calculates the chromatic aberration of magnification from the statistical distribution of the chromatic aberration of magnification on the screen. An image having been subjected to false color reduction processing or the like includes both of portions with reduced chromatic aberration of magnification and portions with chromatic aberration of magnification not reduced. An average value of the statistical distribution of chromatic aberration of magnification for such an image will be a rather smaller value than an actual chromatic aberration of magnification in terms of absolute value. In this case, it is unlikely that the actual chromatic aberration of magnification exceeds the range of the statistical distribution.

Therefore, this image processing device finds a value that is greater than the average value and falls within the range of the statistical distribution from the statistical distribution of chromatic aberration of magnification and set the value as an estimation value of the chromatic aberration of magnification. By such estimation, it is made possible to more accurately estimate pure chromatic aberration of magnification in an optical imaging system even for an image in which chromatic aberration of magnification appears unevenly.

The image processing device in the above-mentioned item [11] detects edge regions from an image and detects a gradient direction of a luminance of the edge. It detects the color shift in the edge regions in the gradient direction of the luminance.

Generally, a color shift occurring in the edge region is conspicuous. In particular, a color shift occurring in the gradient direction of the edge region is more conspicuous. On the other hand, a smooth color shift is visually inconspicuous, even when amounts of the color shift are the same. Therefore, as this image processing device does, detecting the color shift in the edge regions (particularly, in the gradient direction) makes it possible to selectively detect the visually conspicuous color shift.

This also makes it possible to preferentially detect a color shift in a region with a high spatial frequency which is a more conspicuous region, in a case where an image has an uneven color shift in-between a portion with a high spatial frequency and a portion with a low spatial frequency due to false color reduction processing. This realizes a color shift detection more suitable for suppression of a conspicuous color shift.

The image processing device according to the above-mentioned item [12] detects edge regions of an image and detects a color shift in the edge regions in a radius direction around a part corresponding to the optical axis of the optical system used for generation of the image.

Generally, the color shift in chromatic aberration of magnification occurs in the radius direction relative to the center of the optical axis of the optical imaging system. On the other hand, other false colors etc. occur irrespective of the radius direction. Therefore, detecting a color shift only in the radius direction makes it possible to suppress erroneous detection of the color shift due to the false colors etc. As a result, it is made possible to preferentially detect the color shift in the image due to the chromatic aberration of magnification.

The above-described objects and other objects of the present invention can be known readily from the following description and accompanied drawings.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 10 is a flow chart showing the operation in a third embodiment;
FIG. 11 shows directions of the color shift detection;
FIG. 12 shows filters.

DESCRIPTION OF THE PREFERRED EMBODIMENTS

First Embodiment

Figure 1:
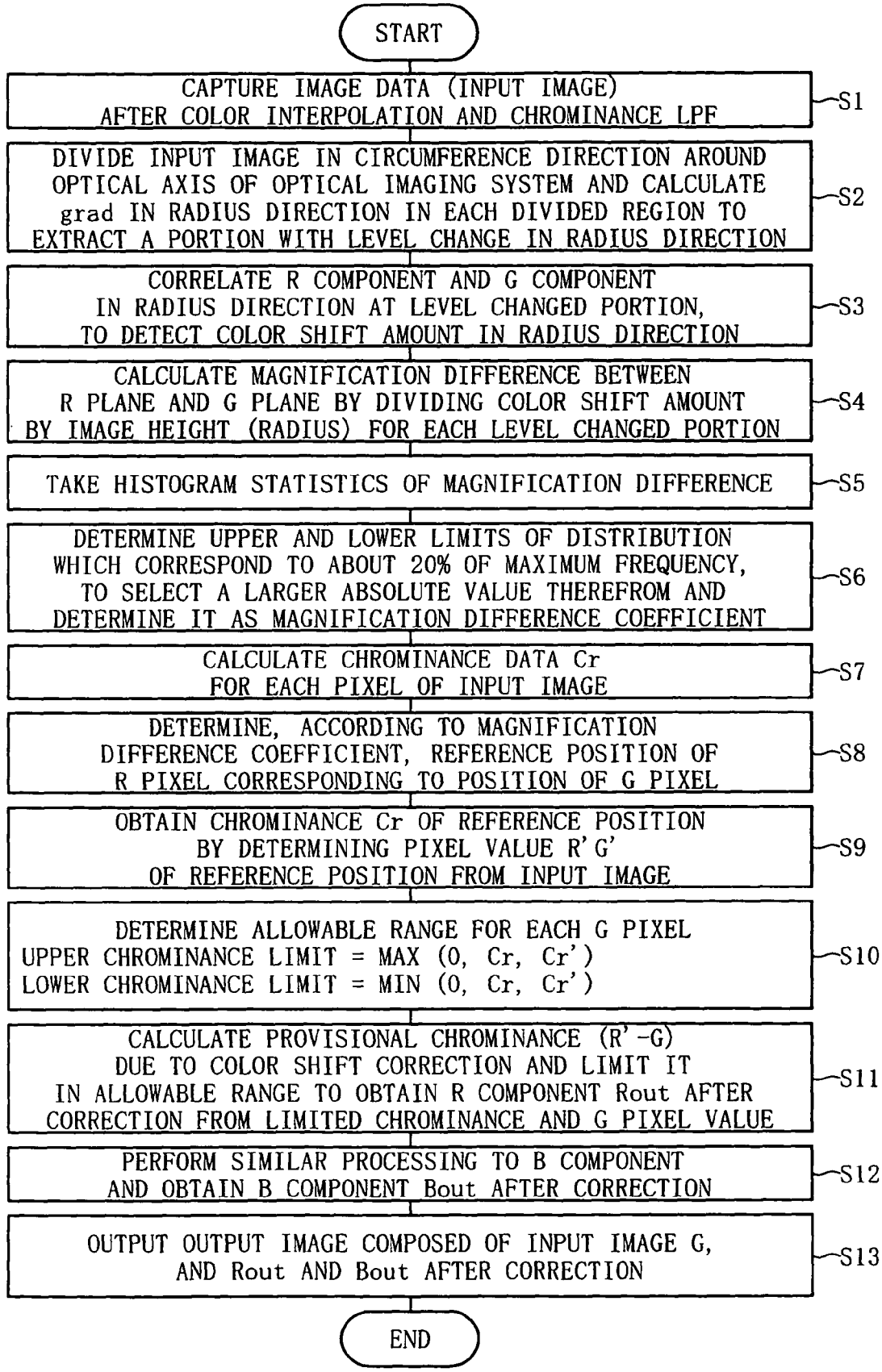
FIG. 1 is a flow chart for explaining a program in a first embodiment.

FIG. 1 is a flow chart for explaining the computer operation by an image processing program. It is possible to cause the computer to function as an image processing device by the image processing program.

The operation in a first embodiment is explained below following the step numbers shown in FIG. 1.

[Step S1]

A computer captures image data (hereinafter, referred to as an "input image") shot by an electronic camera via a recording medium or a communication interface. The input image has already been subjected to color interpolation and chrominance LPF in the electronic camera.

[Step S2]

The computer sets an optical axis center of an optical imaging system in the screen of the input image. Usually, the screen center of the input image is set as an optical axis center by default. In addition, it may also be possible for the computer to acquire the position of the optical axis center from attached information (Exif information etc.) of the input image. In particular, it is preferable to acquire the position of the optical axis center for a crop image (a trimmed partial image etc.)

Next, the computer divides the input image in the circumference direction centering around the optical axis and sets a plurality of divided regions and the radius direction of each divided region.

Figure 2:
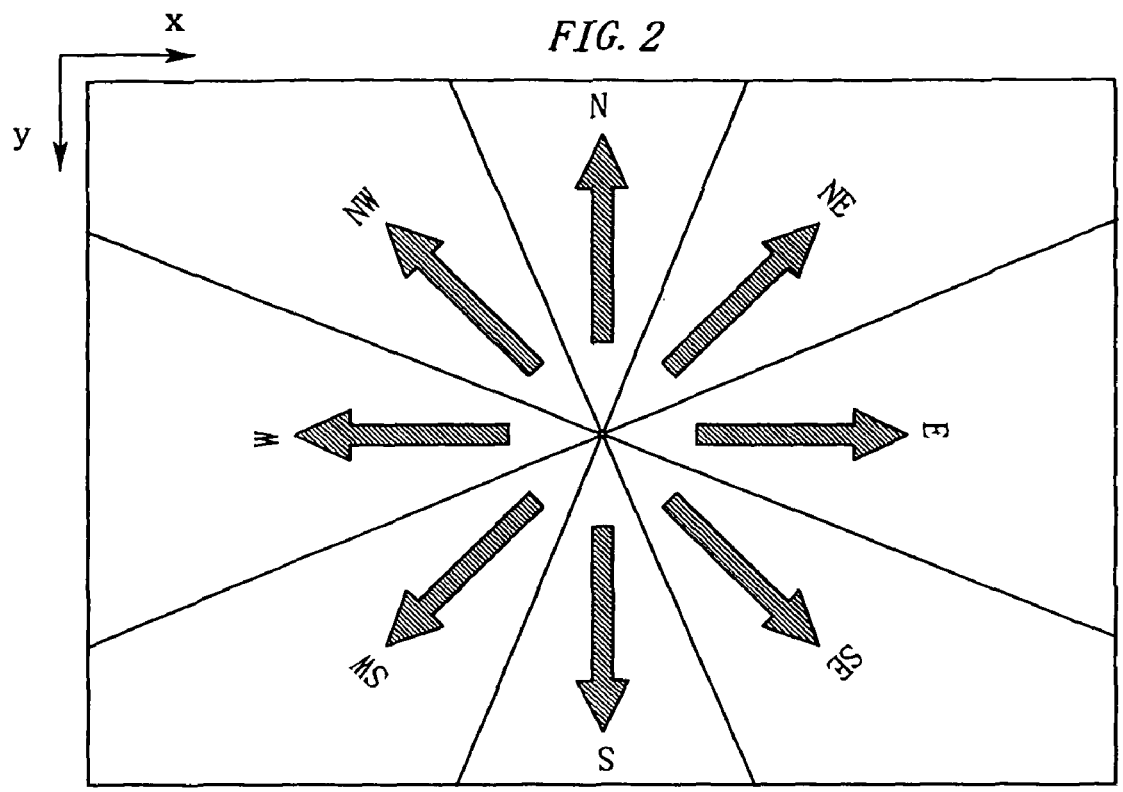
FIG. 2 shows an example of the setting of divided regions and radius directions.
Figure 3:
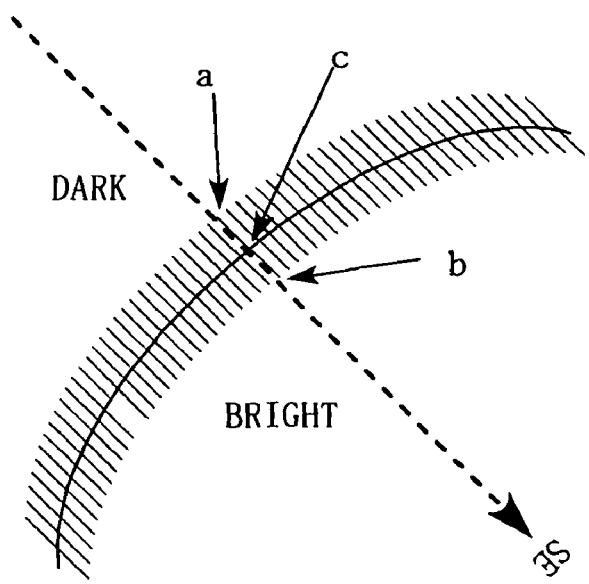
FIG. 3 shows the detection of a portion with a level change.

FIG. 2 shows an example of the setting of the divided region and the radius direction. In the setting, first, the input image is divided into eight divided regions N, NE, E, SE, S, SW, W, and NW and the arrow shown for each divided region is set as its radius direction.

Subsequently, the computer simply calculates the luminance Y from the RGB components of the input image using the following expression etc.

$$Y=(R+G+B)/3$$

The computer calculates the level change of the luminance Y in the radius direction in the screen area (a region etc. 50% or more of the maximum image height distant from the optical axis center) in which the chromatic aberration of magnification can be recognized visually.

Here, by fixing the radius direction for each divided region, it is made possible to perform simple calculation based on the following expressions.

Divided region $N$: grad $Y(x,y)=Y(x,y-1)-Y(x,y)$

Divided region $NE$: grad $Y(x,y)=Y(x+1,y-1)-Y(x,y)$

Divided region $E$: grad $Y(x,y)=Y(x+1,y)-Y(x,y)$

Divided region $SE$: grad $Y(x,y)=Y(x+1,y+1)-Y(x,y)$

Divided region $S$: grad $Y(x,y)=Y(x,y+1)-Y(x,y)$

Divided region $SW$: grad $Y(x,y)=Y(x-1,y+1)-Y(x,y)$

Divided region $W$: grad $Y(x,y)=Y(x-1,y)-Y(x,y)$

Divided region $NW$: grad $Y(x,y)=Y(x-1,y-1)-Y(x,y)$

The computer searches for a pixel (x, y) at which the absolute value of the sought grad Y (x, y) is equal to or greater than a predetermined value Th (for example, about 10 in 256-gradation data).

At this time, the computer calculates a start point a at which a change from dark to light or vice versa begins and an end point b at which the change ends. Next, the computer stores a middle point c between a and b as a portion with a level change and stores the distance between a and b as the thickness of the edge.

Here, the detection of the portion with a level change may be performed discretely on the screen with predetermined sampling intervals.

[Step S3]

The computer sets a local window around the portion with a level change and acquires the G array of the window. Further, the computer acquires the R array from the position to which the window is displaced in the radius direction. Next, after adjusting each signal level of the R array so that the average value of the G array is equal to that of the R array, the computer calculates a difference between elements in the G array and the R array and calculates an overlap error by cumulatively summing up the absolute value of the difference.

The computer searches for such a displacement amount as to reduce the overlap error to minimum (or locally minimum) while changing the displacement amount of the R array with respect to the G array and stores the displacement amount as the color shift amount between the RG components.

At this time, it is preferable to calculate the color shift amount with precision equal to or less than the distance between pixels by interpolating the value of the overlap error.

Further, it is preferable to increase the size of the window in accordance with the thickness of the edge calculated in step 2. In particular, it is preferable to set the width of the window to about four times the thickness of the edge. Due to such window adjustment, it is made possible to include the characteristics of the level change at the edge part within the window at both the steep edge and the gradual edge. As a result, it is made possible to properly detect the color shift amount both at the steep edge and at the gradual edge.

[Step S4]

The computer calculates the magnification difference between the R plane and the G plane by dividing the color shift amount calculated for each portion with a level change by the image height (the radius from the optical axis center) of the portion with a level change, respectively.

[Step S5]

The computer sums the frequency of the magnification difference calculated for each portion with a level change and creates a histogram distribution.

Figure 4:
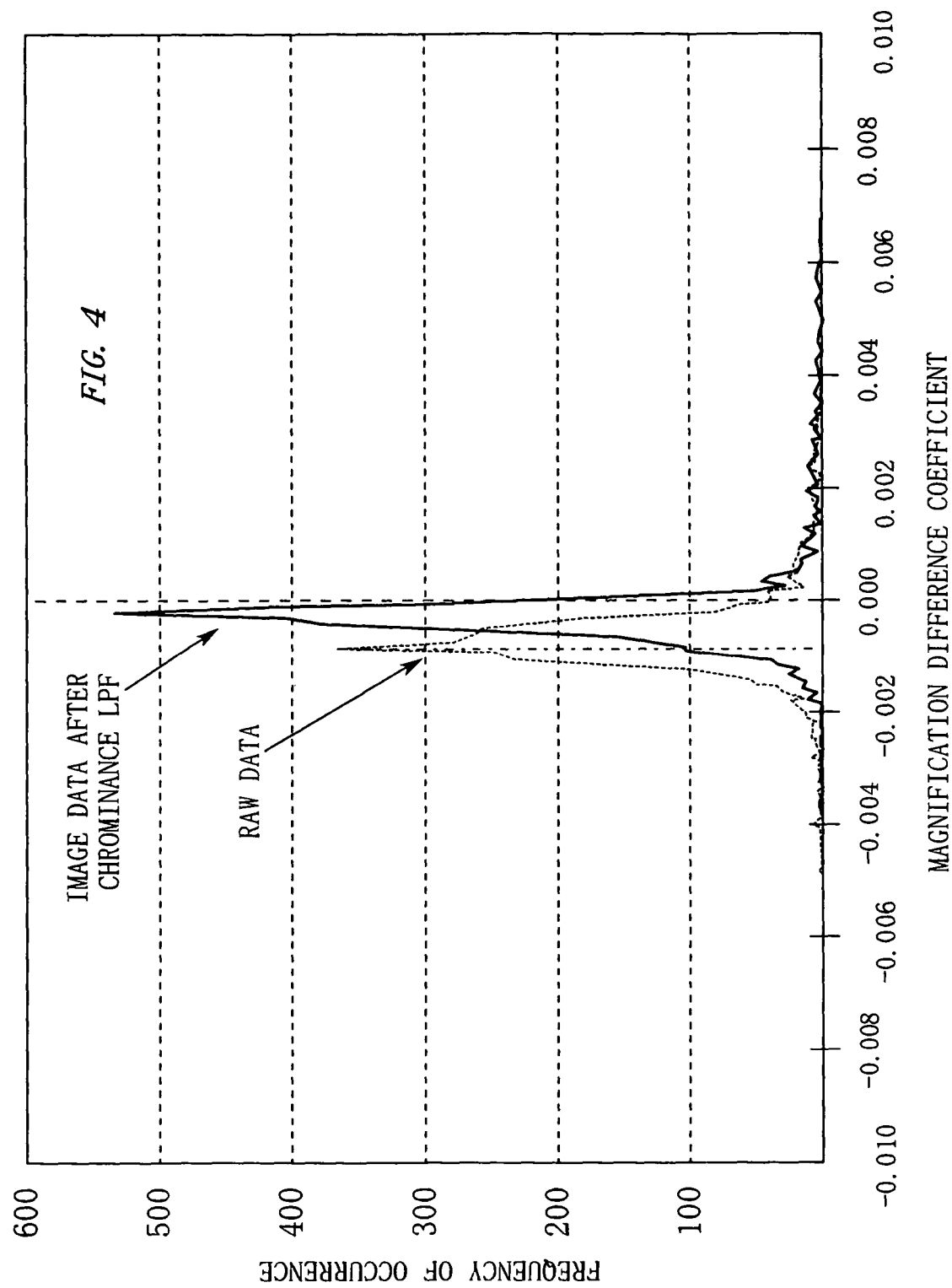
FIG. 4 shows a histogram distribution of the magnification difference.

FIG. 4 shows an example of the histogram distribution. The solid line shown in FIG. 4 indicates the histogram distribution of the input image after the above-described chrominance LPF. The most frequent value in this case is approximately zero. This means that most of the chromatic aberration of magnification has been reduced by the chrominance LPF. On the other hand, the curves that start from the most frequent value are asymmetric and biased to the negative side in FIG. 4. The biased curve shows a remaining chromatic aberration of magnification. In other words, a magnification difference due to the remaining chromatic aberration of magnification takes a negative value almost uniformly. Therefore, the true magnification difference of the optical imaging system is on the biased side.

On the other hand, the dotted line shown in FIG. 4 indicates a histogram distribution of magnification differences, which is created for an experimental purpose, of the RAW data (data before the color interpolation and before the chrominance LPF). The RAW data is not affected by the reducing action of the chromatic aberration of magnification by the chrominance LPF, so that the curve may be substantially symmetric with respect to the most frequent value, that is, substantially a normal distribution. In this case, it is possible to regard that the value of the most frequent value indicates the magnification difference of the optical imaging system to be calculated.

[Step S6]

However, in the case where the RAW data is not stored in the electronic camera and there is only an input image after the chrominance LPF, it is necessary to calculate the magnification difference from the solid line histogram. Therefore, if comparison of the characteristics of both the histograms is made again, the following empirical rules can be found.

(1) First, a bottom part corresponding to about 20% of the maximum frequency of the solid line histogram is calculated to select, from the upper limit and the lower limit of the bottom part, a magnification difference of the one having a greater absolute value. Due to this processing, it is possible to estimate a value approximately equal to the magnification difference of the most frequent value obtained from the RAW data.

(2) Further, the magnification difference of the most frequent value calculated from the RAW data is approximately equal also to the median value on the biased side the solid line histogram, which is calculated from the input image after the chrominance LPF.

(3) Furthermore, it is possible to estimate variations in magnification difference at the portion affected by the chrominance LPF by folding back a less biased side of the solid line histogram symmetrically with regard to the most frequent value. By actually subtracting the variations from the solid line histogram, it is possible to extract the variations in magnification difference only at the portion at which the chromatic aberration of magnification remains. By calculating the most frequent value, the average value, and the median of the extracted variations in magnification difference, it is also possible to estimate a "true magnification difference" not influenced by the chrominance LPF.

The computer calculates the magnification difference of the optical imaging system from the solid line histogram after the chrominance LPF in accordance with any one of the estimation methods in the above-mentioned items (1), (2), and (3) and stores it as a magnification difference coefficient k of the R plane.

[Step S7]

By using the magnification difference coefficient k of the R plane thus calculated, the computer performs magnification adjustment of the R plane and corrects the color shift on the G plane and the R plane.

However, if color shift correction is performed also to the portion influenced by the chrominance LPF, a color shift in the opposite direction will occur. Therefore, the computer determines an allowable range of the chrominance after the color shift correction in order to suppress the color shift in the opposite direction.

As a first candidate of the allowable range, the computer calculates chrominance data Cr for each pixel of the input image. It is only required to calculate the chrominance data Cr for each pixel (x, y) of the input image using $$Cr = R(x,y) - G(x,y).$$

[Step S8]

Next, the computer calculates the following expression using the magnification difference coefficient k of the R plane and calculates the color shift in the corresponding R plane for each pixel (x, y) of the G plane as a displacement vector (dx, dy).

$$dx = -k(x - xo)$$

$$dy = -k(y - yo)$$

Where, (xo, yo) is the optical axis center.

Subsequently, the computer calculates a position (x−dx, y−dy) of the R pixel displaced by the chromatic aberration of magnification from the pixel (x, y) of the G plane and the displacement vector (dx, dy) and set it to a reference position.

[Step S9]

Next, the computer calculates pixel values R' and G' at the reference position (x−dx, y−dy) by interpolation processing to the input image.

Subsequently, the computer calculates a chrominance Cr' of the reference position as a second candidate of the above-described allowable range.

$$Cr' = R' - G'$$

[Step S10]

Further, the computer selects a low chroma chrominance (here, chrominance is zero) as a third candidate of the above-described allowable range. The low chroma chrominance will limit the chrominance after the correction to a low chroma because it is highly possible that a chrominance having the opposite sign of those of the chrominances Cr and Cr' occurs.

Therefore, the chroma chrominance is not limited to the chrominance zero but can be any chrominance indicating a low chroma.

The computer determines the upper limit and the lower limit of the allowable range for each G pixel using the three candidates as follows.

$$\text{Upper chrominance limit} = \max(0, Cr, Cr')$$

$$\text{Lower chrominance limit} = \min(0, Cr, Cr')$$

It may also be possible to obtain chrominance of a local region including the pixel (x, y) obtained from the image before the correction and a group of chrominances consisting of low chroma chrominances, and determine the upper and lower chrominance limit of the group of chrominances to be an allowable range. It is advantageous that the allowable range can be determined readily from the image before the correction.

[Step S11]

Next, the computer calculates a provisional chrominance (R'−G) that appears after the color shift correction from the pixel value R' of the reference position (x−dx, y−dy) and the pixel value G of the pixel (x, y).

The computer limits the chrominance (R'−G) by the upper chrominance limit and the lower chrominance limit determined in step S10. At this time, the portion at which the chrominance goes out from the allowable range will be the detection portion of the color shift erroneous correction.

Specifically, if the lower chrominance limit≦chrominance (R'−G)≦upper chrominance limit, the pixel value R' is regarded as an R component Rout after the correction.

If lower chrominance limit>chrominance (R'−G), the pixel value of the lower limit (G+lower chrominance limit) is regarded as the R component Rout.

If upper chrominance limit<chrominance (R'−G), the pixel value of the upper limit (G+upper chrominance limit) is regarded as the R component Rout.

By performing such limitation processing for each pixel (x, y), the computer corrects the chromatic aberration of magnification and thus the R plane on which the color shift in the opposite direction is suppressed is completed.

It may also be possible to simultaneously judge and suppress the above-mentioned erroneous correction by an operation to limit the R' value by the amount displaced by the lower chrominance limit and the upper chrominance limit from the G value as a reference.

Further, as another method different from the above, when the chrominance (R'−G) is not within the allowable range, it may also be possible to perform the correction again after reducing the correction amount of the color shift at the portion. When portions not within the allowable range appear in the number equal to or greater than a fixed amount (a fixed area), it may also be possible to perform the color shift correction of the whole R plane again after reducing the value of the magnification difference.

[Step S12]

Next, the computer performs the same processing to the B component of the input image and calculates the B component Bout after the correction for each pixel (x, y).

[Step S13]

The computer outputs an output image the color components of which are the original G component of the input image, the R component Rout calculated by the color shift correction, and the B component Bout calculated by the same color shift correction.

Effects etc. of the First Embodiment

Figure 5:
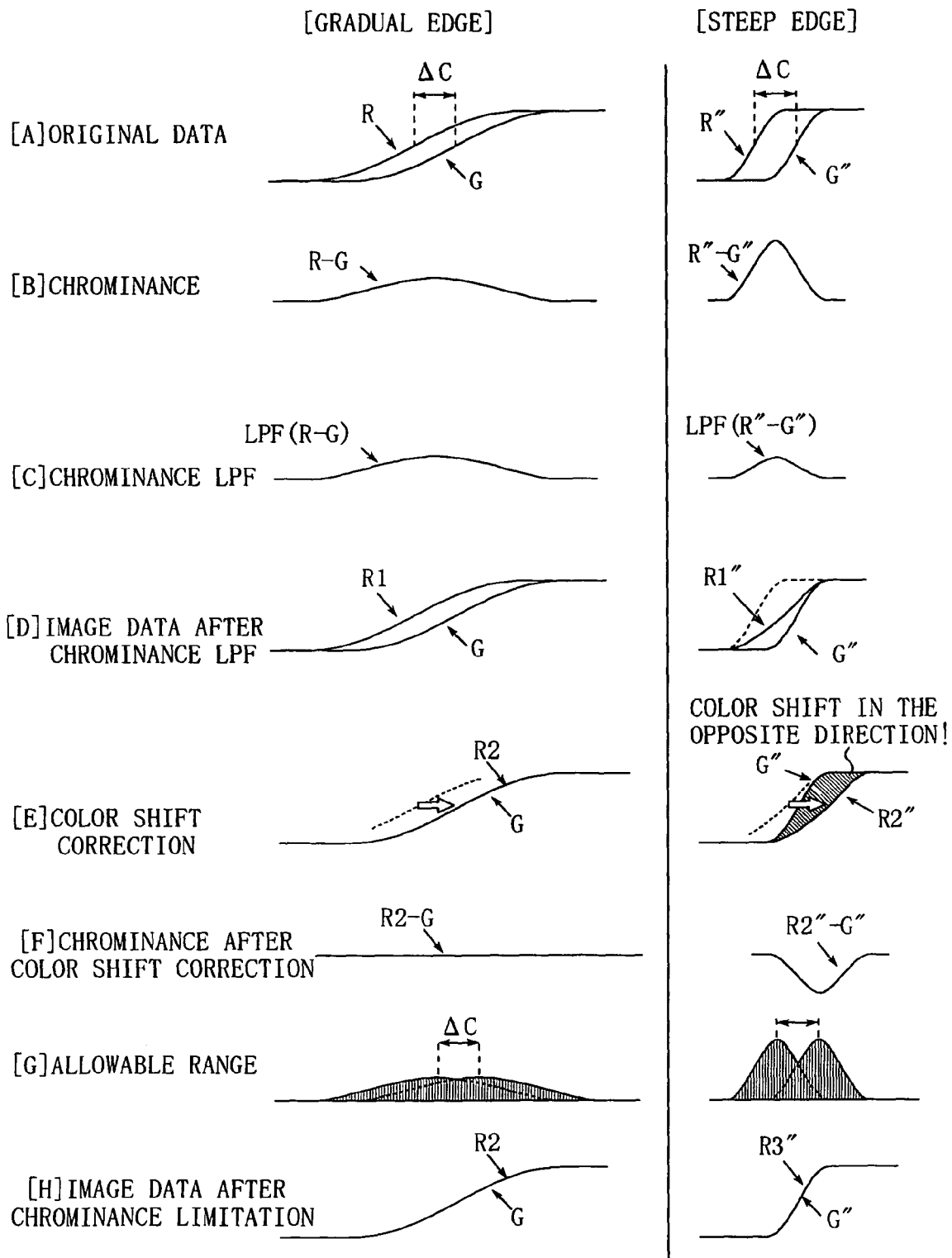
FIG. 5 shows a reducing action of a color shift in the opposite direction.

FIG. 5 is a diagram for explaining the function and effect of the present embodiment.

First, FIG. 5[A] shows a gradual edge (R, G) and a steep edge (R", G"). When the image heights of both the edges are equal to each other, color shifts ΔC due to the chromatic aberration of magnification at both the edges are equal to each other.

FIG. 5[B] shows the chrominances of both the edges, respectively. In this case, due to the color shift ΔC, a chrominance change (R−G) in the low frequency area appears at the gradual edge. On the other hand, at the steep edge, a chrominance change (R"−G") in the high frequency area appears due to the color shift ΔC.

FIG. 5[C] shows the result of the performance of the chrominance LPF for both the chrominance changes. In this case, at the gradual edge, the chrominance change in the low frequency area is maintained and allowed to pass. On the other hand, at the steep edge, the chrominance change in the high frequency area is suppressed by the chrominance LPF.

FIG. 5[D] shows the RG components (R1 and G in the figure) after the chrominance LPF. In this case, at the gradual edge, the R components R and R1 before and after the chrominance LPF do not change quite and the color shift ΔC due to the chromatic aberration of magnification remains as it is.

On the other hand, at the steep edge, the chrominance change in the high frequency area is suppressed by the chrominance LPF, therefore, the phase difference in the RG components (R1" and G" in the figure) after the chrominance LPF becomes small. As a result, the color shift due to the chromatic aberration of magnification is improved.

For these reasons, after completion of the chrominance LPF, the chromatic aberration of magnification remains in the portion with a low spatial frequency but it is reduced in the portion with a high spatial frequency.

As described above, due to the local image structure, the chromatic aberration of magnification occurs unevenly in the screen. Because of this, the solid line histogram shown in FIG. 4 will not simply be a normal distribution and an asymmetric bias occurs in the variations in the histogram. In step S6 of the present embodiment, attention is paid on the asymmetric bias to estimate the variation distribution of the magnification difference, which should be symmetric originally, and the true magnification difference (magnification difference coefficient) has been successfully determined from the estimation result.

FIG. 5[E] shows a state in which the color shift ΔC of the R component has been returned to the original pixel position using the magnification difference coefficient thus determined. In this case, at the gradual edge, due to the displacement as far as R2 in the figure, removal of the chromatic aberration of magnification will succeed. On the other hand, at the steep edge, because of the influence of the chrominance LPF, the color shift correction acts excessively, resulting in the displacement as far as R2" in the figure, and a color shift in the opposite direction occurs.

FIG. 5[F] shows chrominances (R2−G) and (R2"−G") after the color shift correction. In this case, at the gradual edge, the color shift is corrected favorably, therefore, the chrominance (R2−G) does not change so much before and after the color shift correction. On the other hand, at the steep edge, a color shift in the opposite direction occurs, therefore, the chrominance (R2"−G") changes considerably before and after the color shift correction. With this properties being focused on, in step S10 of the present embodiment, an allowable range is determined so that the chrominance does not change so much before and after the color shift correction.

FIG. 5[G] shows a thus determined allowable range (a region with vertical lines in the figures). At the gradual edge, the chrominance change before and after the color shift correction is small and substantially falls within this allowable range, therefore, limitation of the color shift correction is not imposed positively. On the other hand, at the steep edge, due to the color shift in the opposite direction, the chrominance change before and after the color shift correction is large and the chrominance change is limited positively by the allowable range.

FIG. 5[H] shows image data after the color shift correction when chrominance limitation is imposed. At the gradual edge, as R2 and G shown in the figure, almost no chrominance limitation is imposed and the favorable color shift correction is maintained as it is. On the other hand, at the steep edge, as R3" and G" shown in the figure, chrominance limitation is imposed, therefore, the color shift correction is weakened. As a result, the color shift in the opposite direction is suppressed.

The chrominance limitation explained here is effective not only for an image having been subjected to the chrominance LPF processing but also for suppressing the erroneous correction (in particular, excessive correction) when a color shift in a general image is corrected.

Figure 6:
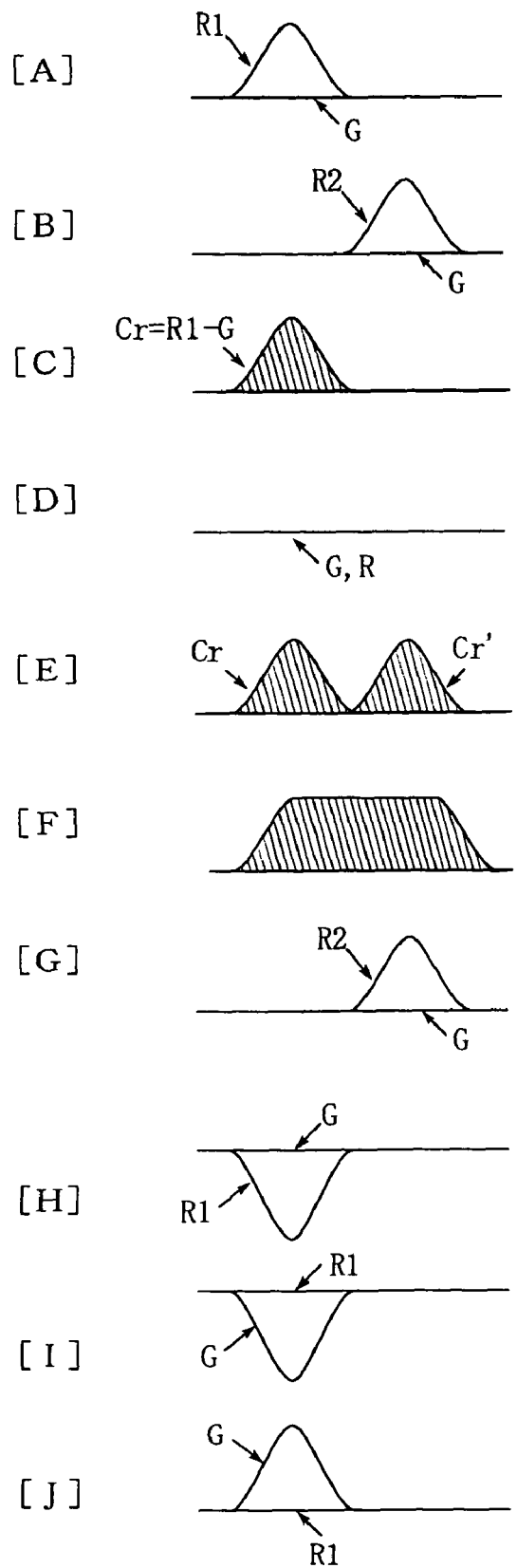
FIG. 6 shows the effect of an allowable range.

FIG. 6 is a diagram for explaining the reason that the upper limit and the lower limit of the chrominance are set to max(0, Cr, Cr') and min(0, Cr, Cr'), respectively.

FIG. 6[A] shows an example where the image structure becomes extinct when the upper chrominance limit of the allowable range is temporarily set to max(0, Cr). In this image, the G component does not change but the R component R1 varies considerably locally. As a result, the chrominance becomes large at the peak portion of the R component R1. If correction is made such that the R component R1 is shifted in the rightward direction in the figure as shown in FIG. 6[B], a new peak appears in the chrominance after the correction. The chrominance after the correction has a large peak because of the structure of the image and not because of false colors or secondary color shifts. Here, if the upper chrominance limit is temporarily set to max(0, Cr), the allowable range will be a diagonally shaded region shown in FIG. 6[C] and the chrominance after the correction becomes extinct as the RG components shown in FIG. 6[D].

In order to avoid such destruction of the image structure, it is important to reflect the chrominance Cr' at the reference position or the group of chrominances Cr in the proximate local region in the allowable range. By such an artifice, the allowable range will be the diagonally shaded range in FIG. 6[E] or FIG. 6[F]. In such an allowable range, the chrominance peak after the correction is maintained and the image structure is kept correctly as R2 and G shown in FIG. 6[G].

Similarly, FIG. 6[H] shows an example where the image structure is destroyed when the lower chrominance limit of the allowable range is set to min(0, Cr). FIG. 6[I] shows an example where the image structure is destroyed when the upper chrominance limit of the allowable range is set to max(0, Cr'). FIG. 6[J] shows an example where the image structure is destroyed when the lower chrominance limit of the allowable range is set to min(0, Cr'). For each of these cases, it is possible to verify that the image structure after the correction is kept correctly by the same procedure as that in FIG. 6[A] to FIG. 6[G].

Second Embodiment

Figure 7:
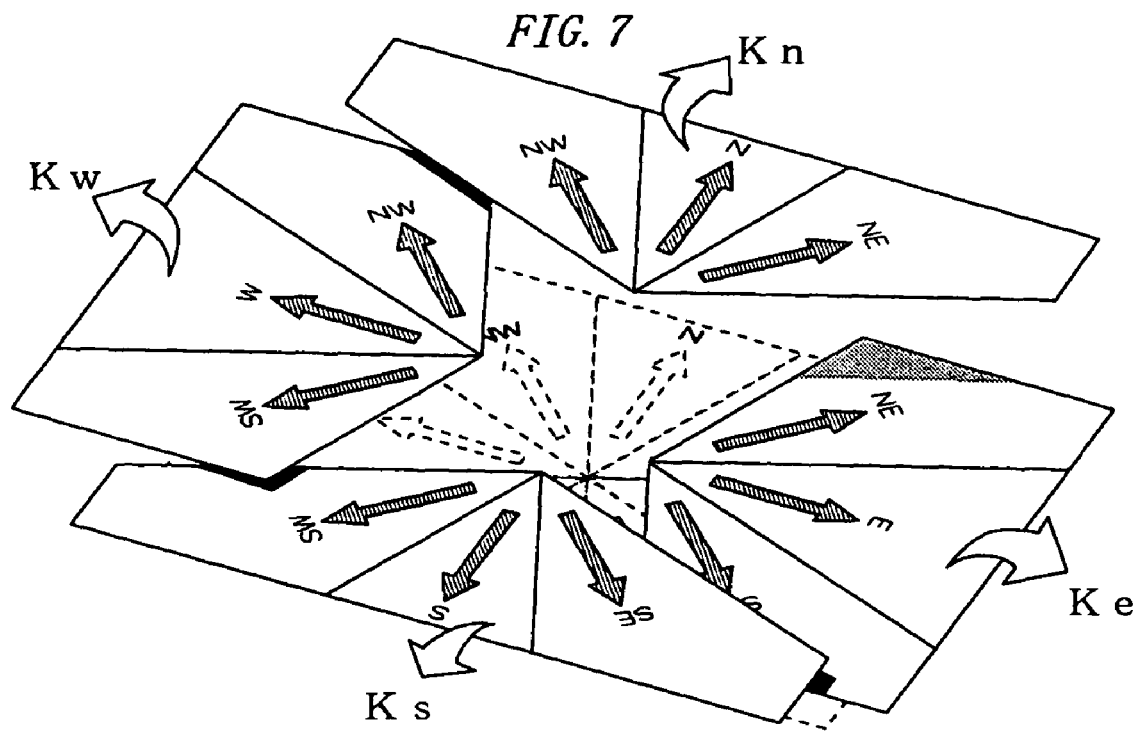
FIG. 7 is a flow chart for explaining region division in a second embodiment.
Figure 8:
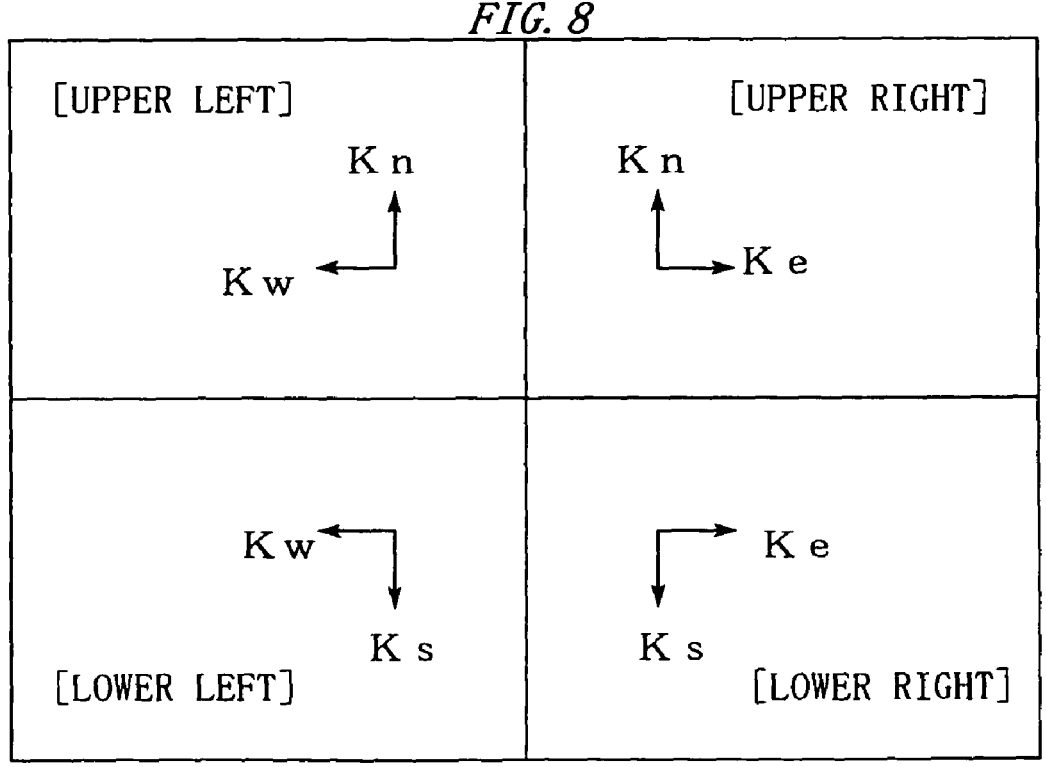
FIG. 8 shows calculation of displacement vectors.

FIG. 7 and FIG. 8 are diagrams for explaining the second embodiment.

In general, the optical axis center of an optical imaging system is located substantially at the screen center of image data. Because of this, usually, the chromatic aberration of magnification is produced in a point symmetric manner with respect to the screen center.

However, in some of optical imaging systems (shift lenses or hand movement compensated lenses), the optical axis center of the optical imaging system does not necessarily coincide with the screen center of image data. Further, a case is supposed where the optical axis center of an optical imaging system comes not to coincide with the screen center of image data any longer after the image data is subjected to trimming (cropping) by processing on an electronic camera or a computer. If any manufacture error should occur in a lens, there is the possibility that the chromatic aberration of magnification is not produced in a point symmetric manner with respect to the screen center. Furthermore, the color shift produced in an image also depends on the spectral distribution of an object, therefore, there may be the case where the color shift is produced differently in each region. In such a case, if the color shift correction is performed to the screen center, the correction effect will be reduced more or less.

Therefore, the second embodiment discloses effective color shift correction even in the case where the optical axis center shifts from the screen center as described above.

The operation of the second embodiment is explained below.

(1) A computer executes the operations in the above-described steps S2 to S4 or steps S21 to S24 and calculates the magnification difference in color shift for each of the eight divided regions N, NE, E, SE, S, SW, W, and NW.

(2) Next, as shown in FIG. 7, the computer combines threes divided regions each to classify them into an upper side group (NW, N, NE), a right side group (NE, E, SE), a lower side group (SE, S, SW), and a left side group (SW, W, NW) by. The computer performs a histogram analysis of the magnification difference and calculates four magnification difference coefficients Kn, Ke, Ks, and Kw, respectively, for each of the four groups.

Figure 14:
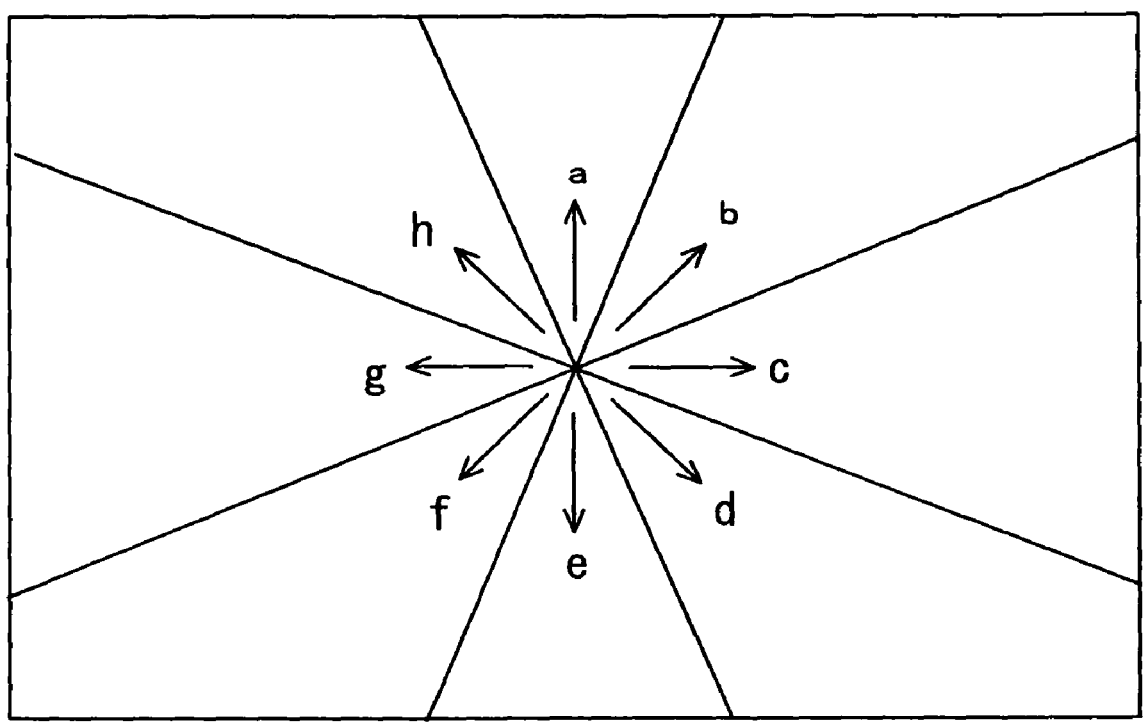
FIG. 14 shows radius directions.

(3) Subsequently, as shown in FIG. 14, the computer divides the screen into upper-right, lower-right, lower-left, and upper-left sections. The computer calculates a displacement vector (dx, dy) of the color shift by combining the magnification difference coefficients in the neighboring groups and vector-synthesizing them in accordance with the following expressions.

Upper-right: $dx=-ke(x-xo), dy=-kn(y-yo)$

Lower-right: $dx=-ke(x-xo), dy=-ks(y-yo)$

Lower-left: $dx=-kw(x-xo), dy=-ks(y-yo)$

Upper-left: $dx=-kw(x-xo), dy=-kn(y-yo)$

Where, (xo, yo) is the screen center.

As described above, the magnification difference coefficients in the plural directions are vector-synthesized. At this time, if the magnification difference coefficients differ from direction to direction, the crossing point of the displacement vectors in the above expressions, that is, the optical axis center, shifts from the screen center (xo, yo). Therefore, it is made possible to flexibly deal with the case where the optical axis center shifts from the screen center (xo, yo) by the above-mentioned calculation and further, it is made possible to calculate a more proper general-purpose displacement vector.

The operation after the displacement vector (dx, dy) is calculated is the same as that in the first embodiment, therefore, its explanation is omitted here.

Third Embodiment

The third embodiment describes a computer equipped with the image processing function of the present invention.

Figure 9:
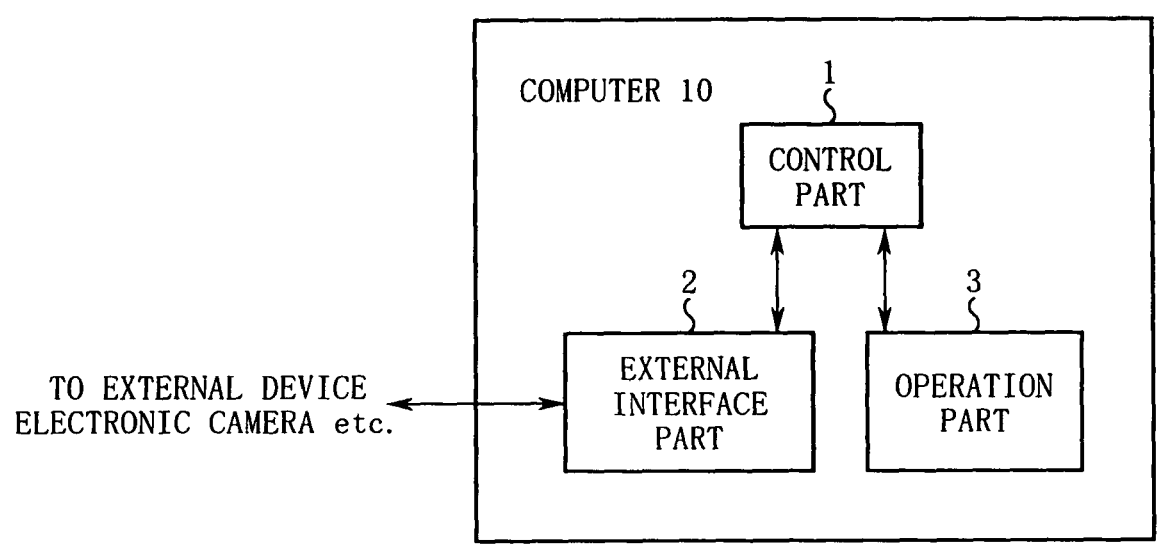
FIG. 9 shows a configuration of a computer 10.

As shown in FIG. 9, a computer 10 includes a control part 1, an external interface part 2, and an operation part 3. The control part 1 records in advance a program for performing the image processing of the present invention. Further, the external interface part 2 interfaces with an external device such as an electronic camera via a predetermined cable or a radio channel. The operation part 3 is equipped with a keyboard, a mouse, etc., although not shown.

In the computer 10 having a configuration as shown in FIG. 9, it is possible for the external interface part 2 to capture an image from an external device such as an electronic camera, not shown, in accordance with the direction of the control part 1. The operation part 3 accepts various user operations. The state of the operation part 3 is detected by the control part 1.

FIG. 10 shows a rough flow of color shift correction. Explanation is given below following the step numbers.

[Step S101]

First, the computer 10 reads an image from an external device such as an electronic camera, not shown, via the external interface part 2. It may also be possible to design so that an image recorded in a recording part, not shown, in the computer 10 is read (read out). At this time, the image to be read is an image to be processed, having respective color component planes of R, G, and B.

Here, it is assumed that the number of pixels in the x axis direction of the image to be read is Nx, the number of pixels in the y axis direction is Ny, and the origin is any one of four corners of the image.

[Step S102]

First, the control part 1 detects an edge. The detection of an edge is performed by first calculating the luminance Y on the assumption that, for example, Y=(R+G+B)÷3 and performing differentiation of the luminance for all of the pixels in the image in the eight directions, that is, the longitudinal directions, the transverse directions, the oblique 45-degree directions, and the oblique 135-degree directions. The eight directions are those shown by a to h in FIG. 11. The differentiation of the luminance is performed respectively by using the filters shown in a to h in FIG. 12. Then, if any of the differentials of the luminance in the eight directions is greater than a predetermined value (for example, about 10 in 256 gradations), the portion is regarded as an edge.

The control part 1 performs the above processing for the whole image and detects an edge.

Then, color shift direction detection portions are provided at intervals of several pixels in the vicinity of the detected edge and the direction in which the differential of the luminance is greatest among the eight directions in which the differentials are calculated at the portions as described above is determined as the gradation direction of the luminance of the edge. Then, this gradient direction of the luminance of the edge is regarded as the color shift detection direction, which will be described later.

Figure 13:
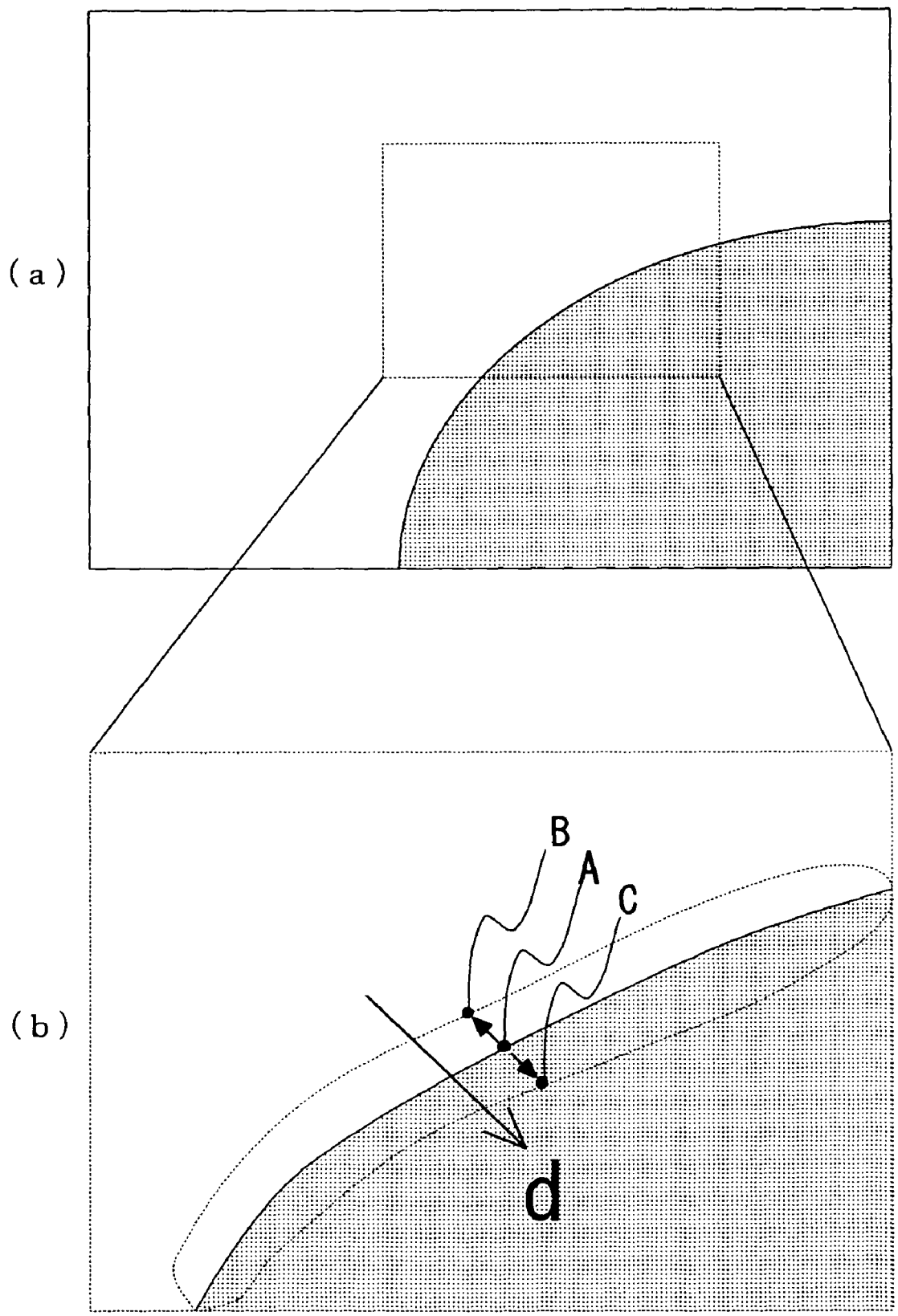
FIG. 13 shows the detection of the width of an edge.

Next, the control part 1 detects the width of the edge in the gradient direction of the luminance described above. Specific explanation is given using FIG. 13. FIG. 13($a$) is a general view of the image to be processed and FIG. 13($b$) is a partially enlarged diagram. A pixel A in FIG. 13 shows an example of the above-described color shift detection portion.

FIG. 13 shows an example in which the gradient direction of the luminance is the direction of the arrow d in FIG. 11. The diagonally shaded part in FIG. 13 shows the object region.

As shown in FIG. 13, when the width of an edge is detected in the direction of the arrow d, the differential of the pixel A and the pixel adjacent to the pixel A along the arrow d is calculated. Next, the differential between the pixel and the further neighboring pixel is calculated and when a pixel P (p) is not an edge and the next pixel P (p+1) is an edge, the pixel P (p) is determined as a pixel B (refer to FIG. 13). Further, the same processing is performed in the opposite direction and when a pixel P (q) is an edge and the next pixel P (q+1) is not an edge, the pixel P (q) is determined as a pixel C (refer to FIG. 13). The pixel B and the pixel C thus calculated correspond to the pixels substantially at the edge end as shown in FIG. 13. Then, the control part 1 determines the distance between the pixel B and the pixel C as the width of the edge. Based on the width of the edge, the size of a window, which will be described later, is determined. Specifically, the size of the window is set to about four times the width of the edge.

Further, the control part 1 calculates the chrominance Cr=(R−G) of R and the chrominance Cb=(B−G) of B at the pixels A, B, and C. When the absolute value of Cr of the pixel A is greater than that of Cr of the pixels B and C, or when the absolute value of Cb of the pixel A is greater than that of Cb of the pixels B and C, the pixel A is determined as an object of the color shift detection, and the region between the pixel B and the pixel C is determined as a region which needs a color shift correction. Here, the absolute value of the chrominance of the pixels B and C corresponds to the predetermined value in the above-mentioned item [14]. Such processing allows the chroma of the edge part to be obtained and makes it possible to perform the color shift detection and correction only on a part of the edge of the image at which the chromatic aberration of magnification has occurred.

[Step S103]

Next, the computer 10 detects the color shift in the image of the R component to the image of the G component. The computer similarly detects the color shift in the image of the B component to the image of the G component.

Here, the image of the G component corresponds to the "image signal of an arbitrary color component plane among the plurality of color component planes" and the image of the R component (the image of the B component) corresponds to the "image signal of another color component plane different from the arbitrary color component plane".

The control part 1 performs the detection of the color shift in the image of the R component to the image of the G component for each color shift detection portion determined in step S102. First, the control part 1 is provided with a window around the color shift detection portion. The window is a square region and the length of its side is made to have about four times the width of the edge calculated in step S102. Then, an image of the window is extracted from the image of the G component among the images to be processed. The image of the window extracted from the image of the G component is referred to as a "G component window".

Then, the image of the R component is extracted from the position shifted by an amount (dx, dy) from the G component window in the x direction and the y direction. The image of the R component to be extracted is the image at the position shifted from the G component window by the amount of shift (dx, dy) and hereinafter referred to as an "R component window".

Then averages of signal values of the G component window and the R component window are calculated and the value is subtracted to make both the average signal values equal. Then, the integral of the absolute value of the difference in signal values between the G component window and the R component window over the whole window is determined as an overlap error of R and G.

The above processing is repeated while the amount of shift (dx, dy) is slightly changed. The amount of shift when the overlap error of R and G is minimum (or local minimum) is determined as a color shift detection value and a chromatic aberration of magnification detection value $d_{min}$ is determined based on the color shift detection value. At this time, it is preferable to detect the chromatic aberration of magnification detection value $d_{min}$ with precision to a decimal fraction or less by performing an operation such as three-point interpolation.

Here, the amount of shift (dx, dy) is adjusted in accordance with the direction of the color shift detection found in S2. Specifically, when the direction of the color shift detection is the transverse direction (arrows c and g in FIG. 11), dx= $-d_{max} \ldots d_{max}$, dy=0, when it is the longitudinal direction (arrows a and e in FIG. 11), dx=0, dy= $-d_{max} \ldots d_{max}$, when it is the oblique 45-degree direction (arrows b and f in FIG. 11), dx=dy, dy= $-d_{max} \ldots d_{max}$, and when it is the oblique 135-degree direction (arrows d and h in FIG. 11), dx=−dy, dy=− $d_{max} \ldots d_{max}$.

Here, $d_{max}$ is the maximum value at which the color shift is detected, and if it is set as $d_{max}$=10, it is possible to deal with almost all of the color shifts. If dx and dy are determined as described above, the number of times that the overlap error of R and G is calculated is reduced than when dx and dy are changed independently from $-d_{max}$ to $d_{max}$, and efficiency can be brought to the processing.

When the edge region is at the end and/or at a part near the end, the image is folded back at the periphery of the image to duplicate it and thus the image is enlarged and the similar detection is performed.

The control part 1 performs the processing explained above for each color shift detection portion detected in step S102.

[Step S104]

Next, the computer 10 corrects the color shift in the image of the R component (B component) to the image of the G component.

The control part 1 corrects the color shift in the image of the R component relative to the image of the G component for each edge region. The control part 1 reads the chromatic aberration of magnification detection value $d_{min}$ calculated in advance for the edge region and moves the image of the R component with respect to the image of the G component by an amount of shift indicated by the chromatic aberration of magnification detection value $d_{min}$ in the direction opposite to the color shift direction indicated by the chromatic aberration of magnification detection value $d_{min}$.

When the image of the R component moves by a decimal fraction pixel, it is assumed that a median value is generated through existing interpolation such as bicubic and bilinear.

The control part 1 performs the processing explained above for each edge region detected in step S102.

[Step S105]

Finally, the computer 10 superposes the image of the G component (the original image of the G component), the image of the R component and the image of the B component after the correction among the images read in step S101 and records it in a recording part, not shown, of the computer 10.

First, the control part 1 superposes the image of the G component (the original image of the G component), the image of the R component corrected in step S104, and the image of the B component corrected in step S106 among the images read in step S101 and records it in a recording part, not shown, in the computer 10.

In other words, correction is performed by moving, among the images of the respective color components of R, G, and B, with respect to the image of the G component that is the image of the color component in charge of the luminance, the image of the R component (or the image of the B component), which is the image of the other color component. Therefore, it is possible to perform the correction of the chromatic aberration of magnification while keeping the image quality (the feeling of sharpness) without degradation of the high frequency components.

<Modifications>

It may also be possible to evaluate the detected color shift after the color shift is detected and perform the correction of the chromatic aberration of magnification based on the result of the evaluation.

It may also be possible for the control part 1 to, after calculating the chromatic aberration of magnification detection value $d_{min}$ for each edge region, when the chromatic aberration of magnification detection value $d_{min}$ in an image in the edge region is quite different from the chromatic aberration of magnification detection value $d_{min}$ in the peripheral color shift detection portion, invalidate the chromatic aberration of magnification detection value $d_{min}$ and perform the correction by substituting the chromatic aberration of magnification detection value $d_{min}$ of a proximate image therefor. Further, it may also be possible to notify a user that the chromatic aberration of magnification detection value $d_{min}$ is not proper. Thus, by evaluating the detected chromatic aberration of magnification detection value $d_{min}$, it is possible to prevent an improper correction from being performed. In addition, it is recommended to make evaluation by calculating the standard deviation of the chromatic aberration of magnification detection value $d_{min}$ calculated for each pixel in the edge region and to invalidate the chromatic aberration of magnification detection value $d_{min}$ or notify a user that the chromatic aberration of magnification detection value $d_{min}$ is not proper when the deviation value is equal to or less than 30 or equal to or greater than 70.

It is also recommended to perform the correction after performing low pass filtering for the chromatic aberration of magnification detection value $d_{min}$ calculated for each pixel in the edge region. In particular, when the correction is performed only to a specific part of an image, it is possible to prevent the image after the correction from deteriorating, which is caused because the amount of correction is not continuous, by performing low pass filer processing using, for example, a 3×3 average filter.

It is also recommended to detect the erroneous correction by comparing the image before the correction with the image after the correction.

The control part 1 calculates a difference in the signal value between the image of the G component and the image of the R component before the correction when, for example, having performed the correction of the color shift in the image of the R component to the image of the G component and further, calculates a difference in the signal value between the image of the G component and the image of the R component after the correction, and compares the two differences. When the difference in the signal value between the image of the G component and the image of the R component after the correction is smaller and the two differences have the same sign, the control part 1 regards that the correction has been performed correctly. On the other hand, when the difference in the signal value between the image of the G component and the image of the R component after the correction is greater, the control part 1 regards that the erroneous correction has been performed. Then, the control part 1 reduces the magnitude of the correction less than the correction based on the sought chromatic aberration of magnification detection value $d_{min}$ and performs the correction of the color shift again.

It may also be possible to perform the re-correction of the color shift to the original image or perform the re-correction in the opposite direction to the image to which the color shift has been corrected once. Further, when reduction of the degree of the correction cannot be made, the image may be brought back into a state in which it is in before the correction or the detection of the color shift may be made again. As described above, by detecting the erroneous correction, it is possible to automatically perform a more proper correction.

As described above, according to the present embodiment, the edge region is detected among the images represented by the plurality of color component (the respective color components of R, G, and B) planes. The gradient direction of the luminance of the edge is detected for each edge region. The color shift in the image between the image signal of an arbitrary color component plane in each of the edge regions and the image signal of another color component plane different from the arbitrary color component plane is detected in the gradient direction, thereby correcting the detected color shift in each region.

As described above, unevenness occurs in the amount of color shift in the image after the color interpolation and the amount of shift differs from edge region to edge region. However, as in the present invention, by selecting the edge region from the image and detecting and performing the correction of the color shift for each edge region, it is possible to properly deal also with the unevenness in the color shift such as that after the color interpolation.

Further, in general, the chromatic aberration of magnification is unlikely to occur on a flat part but is likely to occur at an edge part. Therefore, by detecting an edge region and detecting a color shift in the edge region, it is possible to reduce the processing time taken for the detection and correction of the color shift while detecting with efficiency.

Further, in general, the chromatic aberration of magnification is conspicuous when occurring in the gradient direction of the luminance. Therefore, by detecting the gradient direction of the luminance and detecting the color shift in the direction, it is possible to reduce the processing time taken for the detection and correction of the color shift without degrading precision in detection. Furthermore, with this method, it is possible to calculate the chromatic aberration of magnification detection value $d_{min}$ even when the image to be processed is a trimmed image.

It is also possible to properly correct the chromatic aberration of magnification that occurs locally by causing the region that is the target of the detection of the chromatic aberration of magnification to coincide with the region for which the correction is performed.

Therefore, for each of the reasons described above, according to the present embodiment, it is possible to correct even an irregular chromatic aberration of magnification that has occurred in the image to be processed with high precision and at high speed.

Further, according to the present embodiment, the chroma of the image of each of the edge region is detected to judge whether or not the chroma is higher than the predetermined value. When the chroma is judged to be higher than the predetermined value, the color shift is detected. Because of this, only a part of the edge of the image in which the chromatic aberration of magnification has occurred is the object of the detection and color shift correction, improving efficiency of the processing. Furthermore, the edge of the region in which the chroma of the subject is high is not the object of the correction, thereby decreasing degradation of the image due to the erroneous detection of the color shift.

Furthermore, according to the present embodiment, the size of the edge region is changed according to the width of the edge.

In general, for detection of a color shift in a sharp image (an image with a narrow edge), an edge region can be small in size. On the other hand, for a blurred image (an image with a wide width), the size of the edge region to detect the color shift needs to be large to some extent. Therefore, with the narrow width of the edge, the size of the edge region is reduced, and with the wide width of the edge, the size of the edge region is increased. Changing the size of the edge region as described above can realize efficient detection of the color shift.

Fourth Embodiment

The fourth embodiment is explained below. The present embodiment, as the third embodiment, describes the computer 10 equipped with the function of image processing performed by the image processing device of the present invention. Incidentally, the fourth embodiment is more simplified than the third embodiment.

The rough flow of the correction of the color shift is the same as that in the third embodiment (refer to FIG. 10). Step 102, which is different from that in the third embodiment, is explained below.

In step S102, after detecting an edge region, the control part 1 performs the following processing instead of detecting the gradient direction of the luminance.

First, the control part 1 divides an image to be processed into eight regions with the center of the image being its center as shown in FIG. 14. When the edge region is in a certain region, the direction representative of the region (arrows a to h) is considered as the direction of the color shift detection. In general, the chromatic aberration of magnification frequently occurs in the radius direction (directions of the arrows a to h in FIG. 14) around the part (corresponding to the center of the image to be processed) corresponding to the optical axis of the optical system used when the image is generated. Therefore, by performing the detection of the color shift by shifting in the radius direction, it is possible to reduce the processing time taken for the detection of the color shift without degrading the precision in detection.

Figure 15:
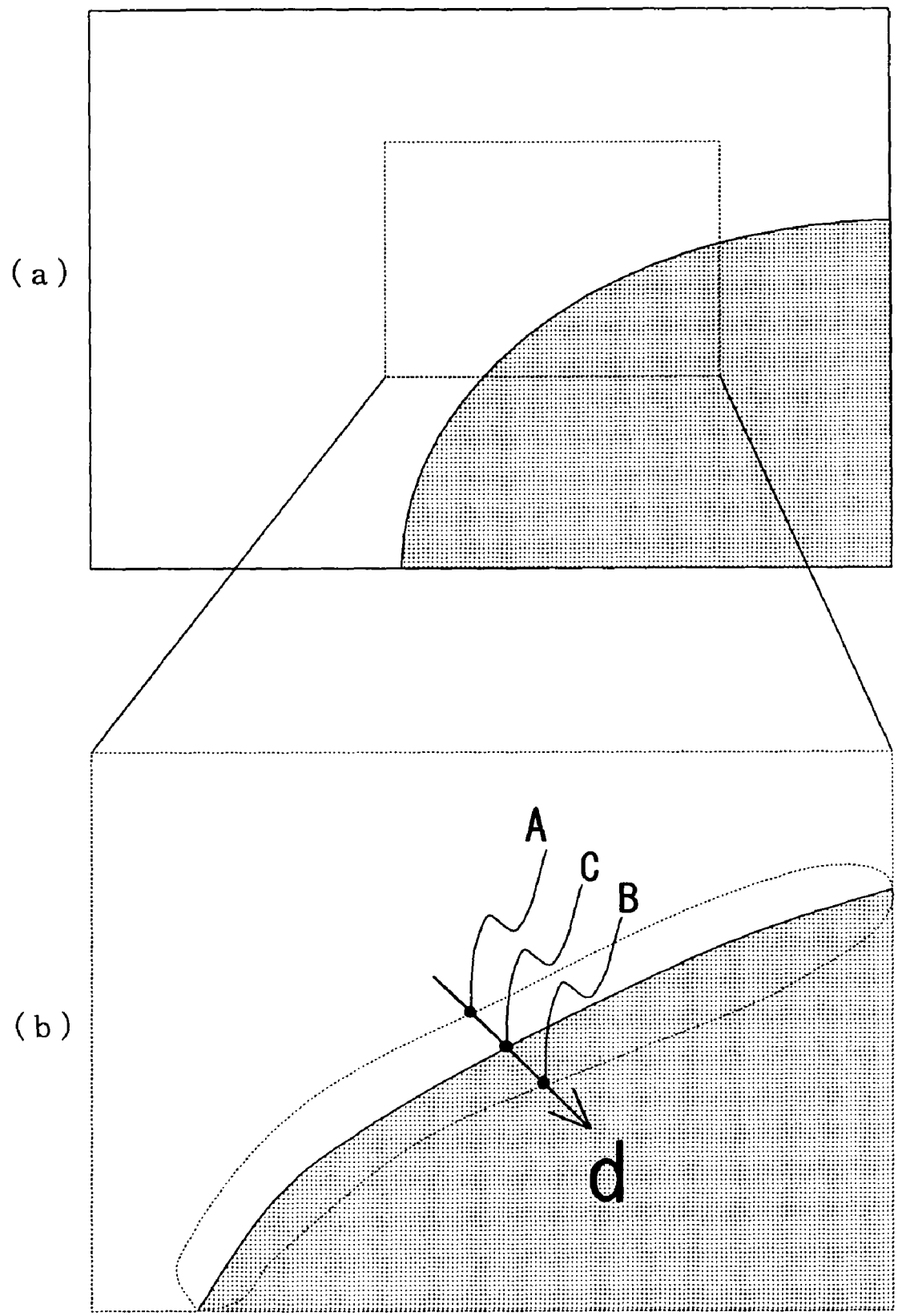
FIG. 15 shows the detection of the width of an edge.

Specific explanation is given using FIG. 15. FIG. 15(*a*) is a general view of an image to be processed and FIG. 15(*b*) is a partially enlarged diagram. FIG. 15 shows an example in which the differential of the luminance in the direction of the arrow d in FIG. 11 (the edge region is in the region d in FIG. 14) is calculated. The diagonally shaded part in FIG. 15 shows the region of the object. The luminance Y is assumed to be, for example, Y=(R+G+B)÷3.

As shown in FIG. 15, when the differential of the luminance is calculated in the direction of the arrow d, the differential of two pixels adjacent to each other along the arrow d is calculated. When a pixel P (p) is not an edge and the next pixel P (p+1) is an edge, the pixel P (p) is determined as a pixel A (refer to FIG. 15). With further differentiation, when a pixel P (q) is an edge and the next pixel P (q+1) is not an edge, the pixel P (q) is determined as a pixel B (refer to FIG. 15). Finally the pixel corresponding to the middle point of the pixel A and the pixel B is determined as a pixel C (refer to FIG. 15). Among the pixels A to C thus calculated, the pixel A and the pixel B indicate the pixel substantially at the edge end and the pixel C indicates the pixel substantially at the edge boundary, as shown in FIG. 15.

Then, the distance between the pixel A and the pixel B is determined as the width of the edge. Based on the width of the edge, the size of the edge region is determined. Specifically, the size of the edge region is set to about four times the width of the edge.

Each of the following processing is the same as that in the third embodiment, therefore, its explanation is omitted.

As described above, according to the present embodiment, the edge region is detected among the images represented by the plurality of color component (the respective color components of R, G, and B) planes, and for each edge region, the color shift between the image signal of an arbitrary color component plane in the image in the edge region and the image signal of another color component plane different from the arbitrary color component plane is detected in the radius direction around the part corresponding to the optical axis in the optical system used when the image is generated, and the detection is performed for each region for which the detected color shift is corrected.

Therefore, it is possible to reduce the processing time taken for the detection and correction of the color shift without degrading the precision in detection.

Fifth Embodiment

The fifth embodiment is explained below. The present embodiment, as the third embodiment and the fourth embodiment, describes a computer equipped with the function of the image processing performed by the image processing device of the present invention. In the fifth embodiment, color bleeding is corrected in addition to the chromatic aberration of magnification in the third and the fourth embodiments.

When shooting with a digital camera etc., the chromatic aberration of magnification will also cause color bleeding. For example, the wavelength of light that an R image pickup device corresponding to an R color filter receives is has a range and the R image pickup device receives light of both of different wavelengths λ1 and λ2. Therefore, with a shooting lens having the chromatic aberration of magnification, light with λ1 and light with λ2 emitted from the same point of an object form an image at different positions, causing a blur in the image of the R component and color bleeding. In the present embodiment, the color bleeding is corrected.

Figure 16:
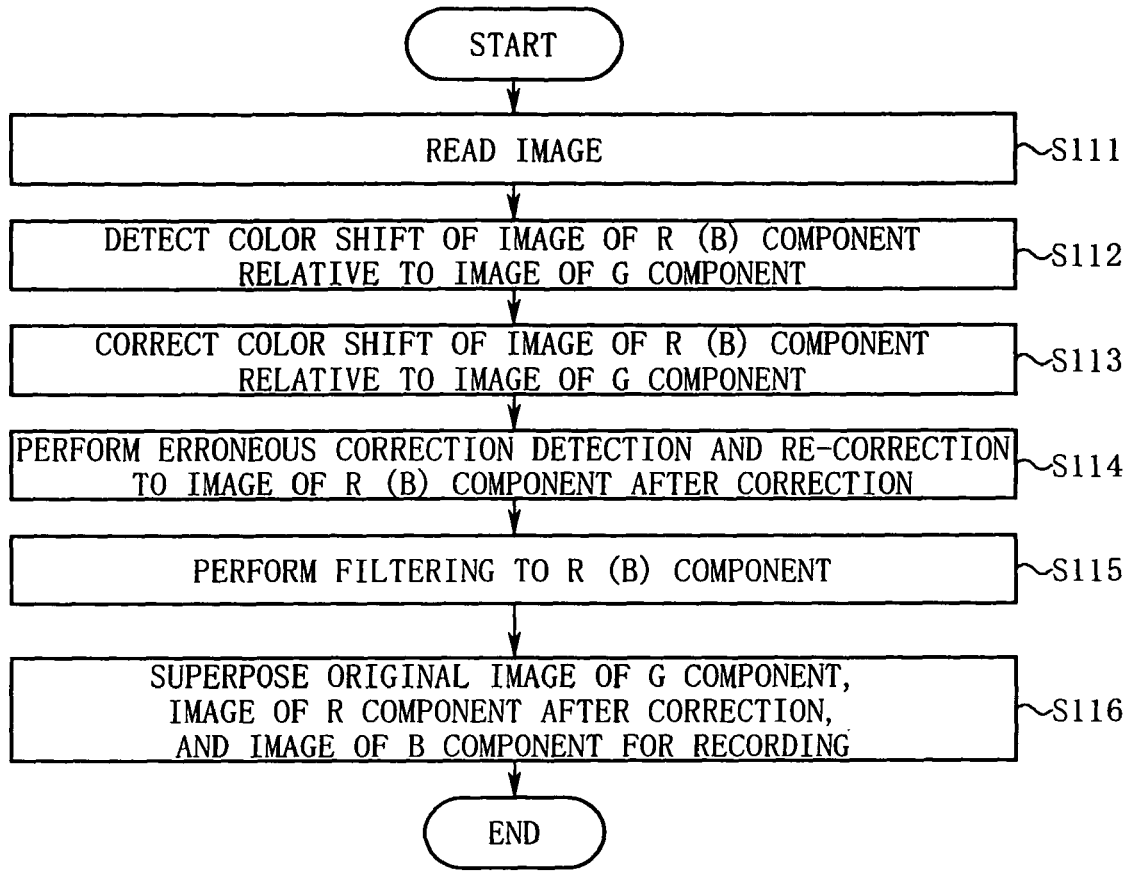
FIG. 16 is a flow chart showing the operation in a fifth embodiment.

FIG. 16 is a flow chart for explaining the correction operation.

[Steps S111 to S113]

The processing is the same as that in steps S101 to 104 in the third embodiment.

[Step S114]

The control part 1 calculates a difference in the signal value between the image of the G component and the image of the R component before the correction and further calculates a difference in the signal value between the image of the G component and the image of the R component after the correction, and compares the two differences. When the difference in the signal value between the image of the G component and the image of the R component after the correction is smaller and the two differences have the same sign, the control part 1 regards that the correction has been performed correctly. On the other hand, when the difference in the signal value between the image of the G component and the image of the R component after the correction is greater, the control part 1 regards that the erroneous correction has been performed. Then, the control part 1 reduces the magnitude of the correction less than the correction based on the sought chromatic aberration of magnification detection value $d_{min}$ and performs the correction of the color shift again.

When performing such re-correction of the color shift, it may also be possible to perform the re-correction of the color shift to the original image or perform the re-correction in the opposite direction to the image to which the correction of the color shift has been performed once. Further, if it is not possible to reduce the magnitude of the correction, it may also be possible to return the state to the state before the correction or start again from the detection of the color shift again.

[Step S115]

The control part 1 calculates the chrominance Cr of the R component for the whole image to be processed. Cr is given, for example, as (R−G). Then, the edge region of the image of Cr calculated in the above is subjected to low pass filter. It is assumed that the low pass filter replaces the chrominance Cr at a certain portion with a weighted average value of a square region with the portion being its center. Further, the area of the square region is determined in accordance with the chromatic aberration of magnification detection value $d_{min}$ calculated in step S113. Specifically, the length of a side of the above-mentioned square region is set to twice to four times the color shift detection value (units: pixel).

The above processing is performed to the whole image. Then, when the chrominance of R after the processing is assumed to be Cr', the R component after the correction is given as (Cr'+G).

The same processing is performed to the B component.

[Step S116]

The processing is the same as that in step S105 in the third embodiment.

As described above, according to the present embodiment, the chrominance is smoothed for each edge region after the correction of the color shift is performed. In general, the degree of color bleeding becomes greater when the chromatic aberration of magnification occurs in the greater magnitude, therefore, by performing such processing, it is made possible to remove the color bleeding in addition to the chromatic aberration of magnification and the quality of the image can be improved.

According to the method explained above, it can be expected to correct also color bleeding not resulting from the chromatic aberration of magnification.

The embodiment above has described the example in which the object to be processed includes the color components of RGB, however, a color coordination system such as one consisting of cyan, magenta, yellow, etc. may be used. It may also be possible to generate an image in another color coordination system based on the image to be processed and perform the same detection and correction on the assumption that the image is to be processed.

The embodiment above has described the image processing device that detects and corrects a color shift, however, only the detection of the color shift may be performed. Then, the image processing device that detects such a color shift can be used in the verifying process etc. in the manufacturing process of lenses.

Sixth Embodiment

The sixth embodiment describes an electronic camera.

Figure 17:
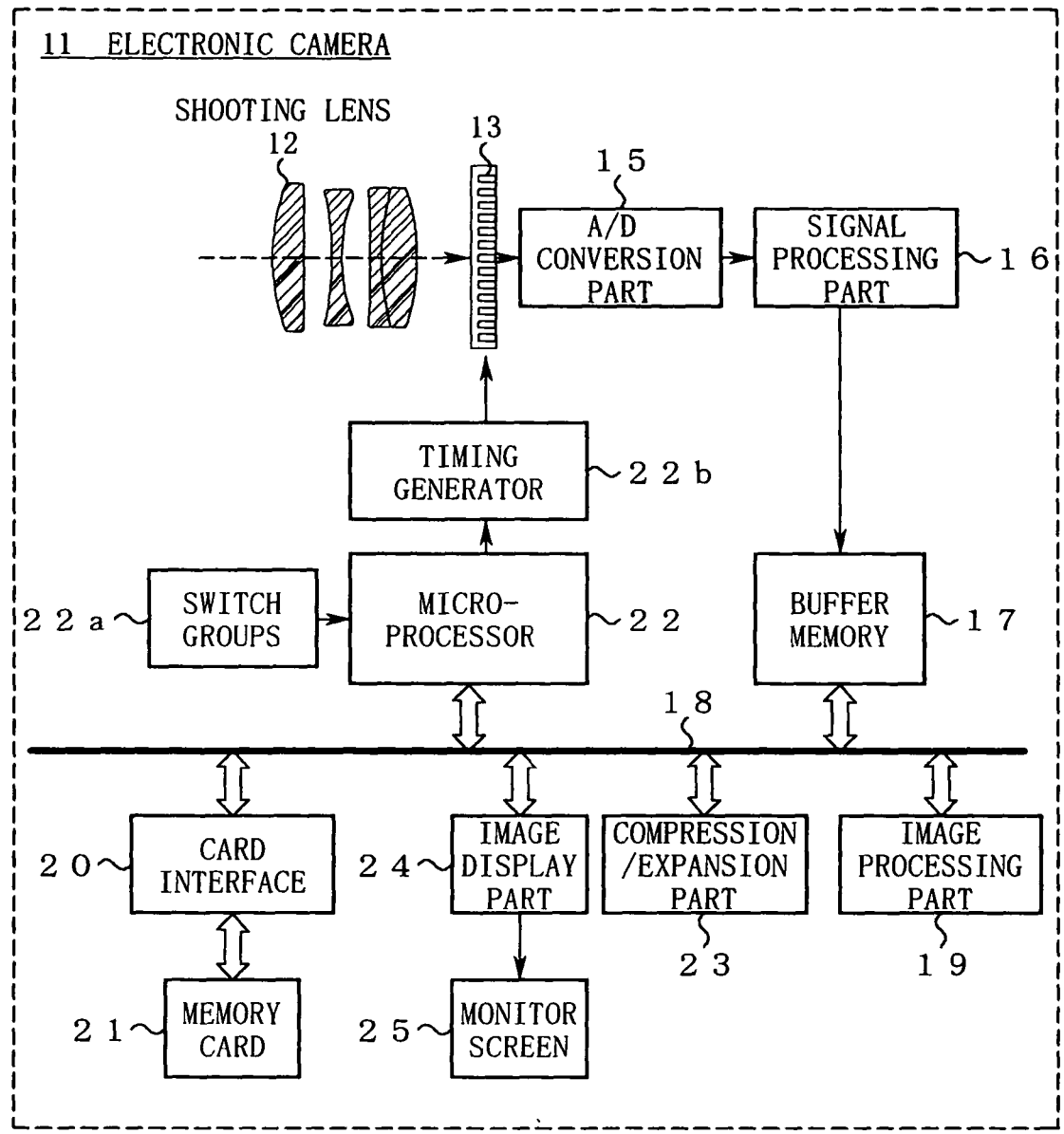
FIG. 17 shows an embodiment of an electronic camera.

FIG. 17 is a block diagram showing a configuration of the present embodiment.

In FIG. 17, a shooting lens 12 is mounted on an electronic camera 11. In the image space of the shooting lens 12, the light receiving plane of an image pickup device 13 is arranged. The operation of the image pickup device 13 is controlled by an output pulse of a timing generator 22b.

An image generated by the image pickup device 13 is stored temporarily in a buffer memory 17 via an analog-to-digital conversion part 15 and a signal processing part 15.

The buffer memory 17 is connected to a bus 18. To the bus 18, an image processing part 19, a card interface 20, a microprocessor 22, a compression/expansion part 23, and an image display part 24 are connected. Among these, the card interface 20 writes and reads data to and from a detachable memory card 21. Further, to the microprocessor 22, a signal of the operation of a user from a switch group 22a of the electronic camera 11 is input. Furthermore, the image display part 24 displays an image on a monitor screen 25 provided on the backside of the electronic camera 11.

The electronic camera 11 having such a configuration executes the image processing in the first to fifth embodiments by means of the microprocessor 22 and the image processing part 19.

As a result, it is possible to create image data from which the influence of the chromatic aberration of magnification of the shooting lens 21 has been reduced in the electronic camera 11.

The invention is not limited to the above embodiments and various modifications may be made without departing from the spirit and scope of the invention. Any improvement may be made in part or all of the components.

What is claimed is:

1. An image processing device which performs image processing to an image represented by a plurality of color component planes, the image processing device comprising:
 a correction unit which corrects a color shift in the image; and
 an erroneous correction detection unit which judges whether the correction unit has made an erroneous correction by comparing the images before and after the correction by the correction unit, wherein
 the erroneous correction detection unit judges the erroneous correction when a chrominance of a portion to be processed of the image after the correction is not within an allowable range which is set using the image before the correction as a reference,
 the erroneous correction detection unit calculates minimum and maximum values of a group of chrominances to set lower and upper limits of the allowable range, respectively, the group of chrominances includes chrominances of the image before the correction within a local region and predetermined chrominances representing low chroma, and the local region includes the portion to be processed, and
 the erroneous correction detection unit sets a maximum value among 0, Cr, and Cr' as the upper limit of the allowable range and sets a minimum value among 0, Cr, and Cr' as the lower limit of the allowable range, wherein Cr and Cr' are chrominances of the image before the correction within the local region, and 0 is a predetermined chrominance representing low chroma; wherein the correction unit and the erroneous correction detection unit include a processor.

2. The image processing device according to claim 1, wherein
 the erroneous correction detection unit suppresses the erroneous correction by limiting the chrominance of the image after the correction within said allowable range.

3. The image processing device according to claim 1, wherein
 when the erroneous correction detection unit judges the erroneous correction, the correction unit suppresses the error correction by reducing a shift amount of the color shift correction.

4. The image processing device according to claim 1, wherein:
 the color shift is a color shift occurring in said image due to a chromatic aberration of magnification of an optical system; and
 the correction unit adjusts (resizes) magnification of the color component planes in such a direction as to negate the chromatic aberration of magnification.

5. A non-transitory computer readable storage medium storing an image processing program which causes a computer to function as the image processing device according to claim 1.

6. An electronic camera comprising the image processing device according to claim 1 and an image pickup part which shoots an object image to generate an image, wherein
 the image generated by the image pickup part is processed by the image processing device.

* * * * *